US011783635B2

(12) United States Patent
Zhang

(10) Patent No.: US 11,783,635 B2
(45) Date of Patent: Oct. 10, 2023

(54) SYSTEMS AND METHODS FOR DETECTING A POSTURE OF A HUMAN OBJECT

(71) Applicant: SHANGHAI TRUTHVISION INFORMATION TECHNOLOGY CO., LTD., Shanghai (CN)

(72) Inventor: Zhong Zhang, Great Falls, VA (US)

(73) Assignee: SHANGHAI TRUTHVISION INFORMATION TECHNOLOGY CO., LTD., Shanghai (CN)

( * ) Notice: Subject to any disclaimer, the term of this patent is extended or adjusted under 35 U.S.C. 154(b) by 398 days.

(21) Appl. No.: 17/039,791

(22) Filed: Sep. 30, 2020

(65) Prior Publication Data
US 2021/0019506 A1    Jan. 21, 2021

Related U.S. Application Data

(63) Continuation of application No. PCT/CN2019/084381, filed on Apr. 25, 2019.
(Continued)

(51) Int. Cl.
G06V 40/20        (2022.01)
G06V 20/52        (2022.01)
(Continued)

(52) U.S. Cl.
CPC ............... G06V 40/23 (2022.01); G06T 7/80 (2017.01); G06V 20/53 (2022.01); G06V 40/103 (2022.01)

(58) Field of Classification Search
CPC ........ G06V 40/20; G06V 40/23; G06V 40/25; G06V 40/10; G06V 40/103; G06V 20/52;
(Continued)

(56) References Cited

U.S. PATENT DOCUMENTS 7,613,324 B2 * 11/2009 Venetianer ............ G06V 20/52
382/103
7,801,330 B2    9/2010 Zhang et al.
(Continued)

FOREIGN PATENT DOCUMENTS

CN    101499128 A    8/2009
CN    101419499 B    6/2010
(Continued)

OTHER PUBLICATIONS

Gkioxari et al., "Contextual Action Recognition with R*CNN", Dec. 2015, IEEE, 2015 IEEE International Conference on Computer Vision (ICCV), p. 1080-1088. (Year: 2015).*
(Continued)

Primary Examiner — Vincent Rudolph
Assistant Examiner — Timothy Choi
(74) Attorney, Agent, or Firm — METIS IP LLC

(57) ABSTRACT

A system for motion detection may include at least one storage medium that includes a set of instructions, and at least one processor in communication with the at least one storage medium. When executing the set of instructions, the at least one processor may be configured to cause the system to obtain data related to a video scene of a space from at least one video camera; detect an object in the video scene; classify the object as a human object or a non-human object; when the object is classified as a human object, track movements of the human object; and determine a posture of the human object in the video scene based on the movements of the human object.

20 Claims, 12 Drawing Sheets

Related U.S. Application Data

(60) Provisional application No. 62/664,064, filed on Apr. 27, 2018.

(51) Int. Cl.
*G06V 40/10* (2022.01)
*G06T 7/80* (2017.01)

(58) Field of Classification Search
CPC .. G06V 20/53; G06T 7/80; G06T 7/70; G06T 7/73; G06T 7/74; G06T 7/75; G06T 7/77
See application file for complete search history.

(56) References Cited

U.S. PATENT DOCUMENTS

| | | |
|---|---|---|
| 9,165,190 B2 | 10/2015 | Zhang et al. |
| 2004/0228494 A1 | 11/2004 | Smith |
| 2005/0265580 A1 | 12/2005 | Antonucci et al. |
| 2008/0122786 A1 | 5/2008 | Pryor et al. |
| 2009/0041297 A1 | 2/2009 | Zhang et al. |
| 2011/0227812 A1 | 9/2011 | Haddick et al. |
| 2012/0250944 A1* | 10/2012 | Yamamoto ........... G06V 40/103 382/103 |
| 2014/0072170 A1* | 3/2014 | Zhang .................... G06V 20/00 382/103 |
| 2016/0259969 A1* | 9/2016 | Nabatame ............. A61B 5/1115 |
| 2017/0287146 A1 | 10/2017 | Pathak et al. |
| 2018/0300538 A1* | 10/2018 | Horie ..................... G06V 20/52 |

FOREIGN PATENT DOCUMENTS

| | | |
|---|---|---|
| CN | 102968802 A | 3/2013 |
| CN | 107038415 A | 8/2017 |
| CN | 107066975 A | 8/2017 |
| CN | 107087211 A | 8/2017 |
| CN | 107166645 A | 9/2017 |
| CN | 206674094 U | 11/2017 |

OTHER PUBLICATIONS

International Search Report in PCT/CN2019/084381 dated Jul. 30, 2019, 4 pages.
Written Opinion in PCT/CN2019/084381 dated Jul. 30, 2019, 4 pages.

* cited by examiner

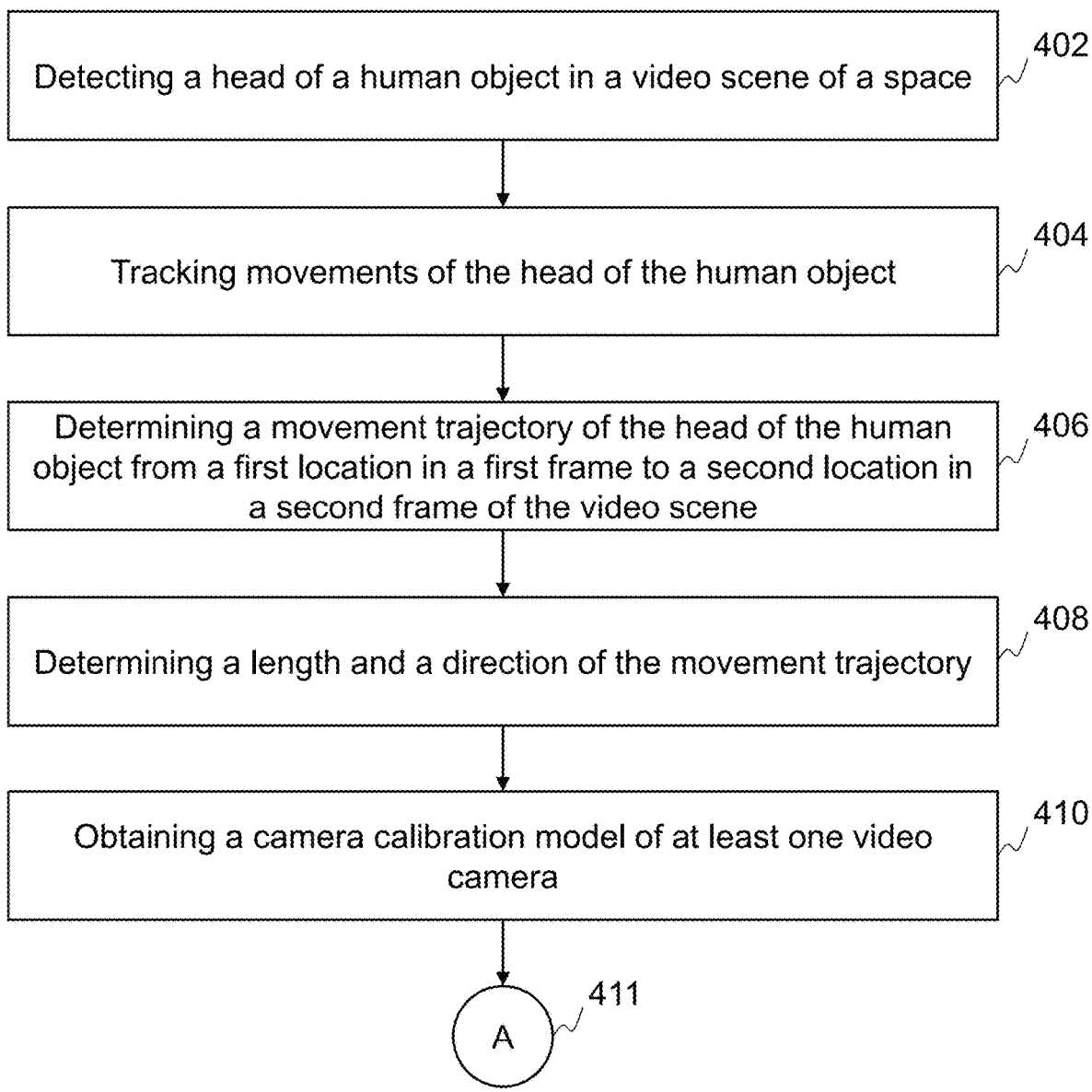
FIG. 4-A

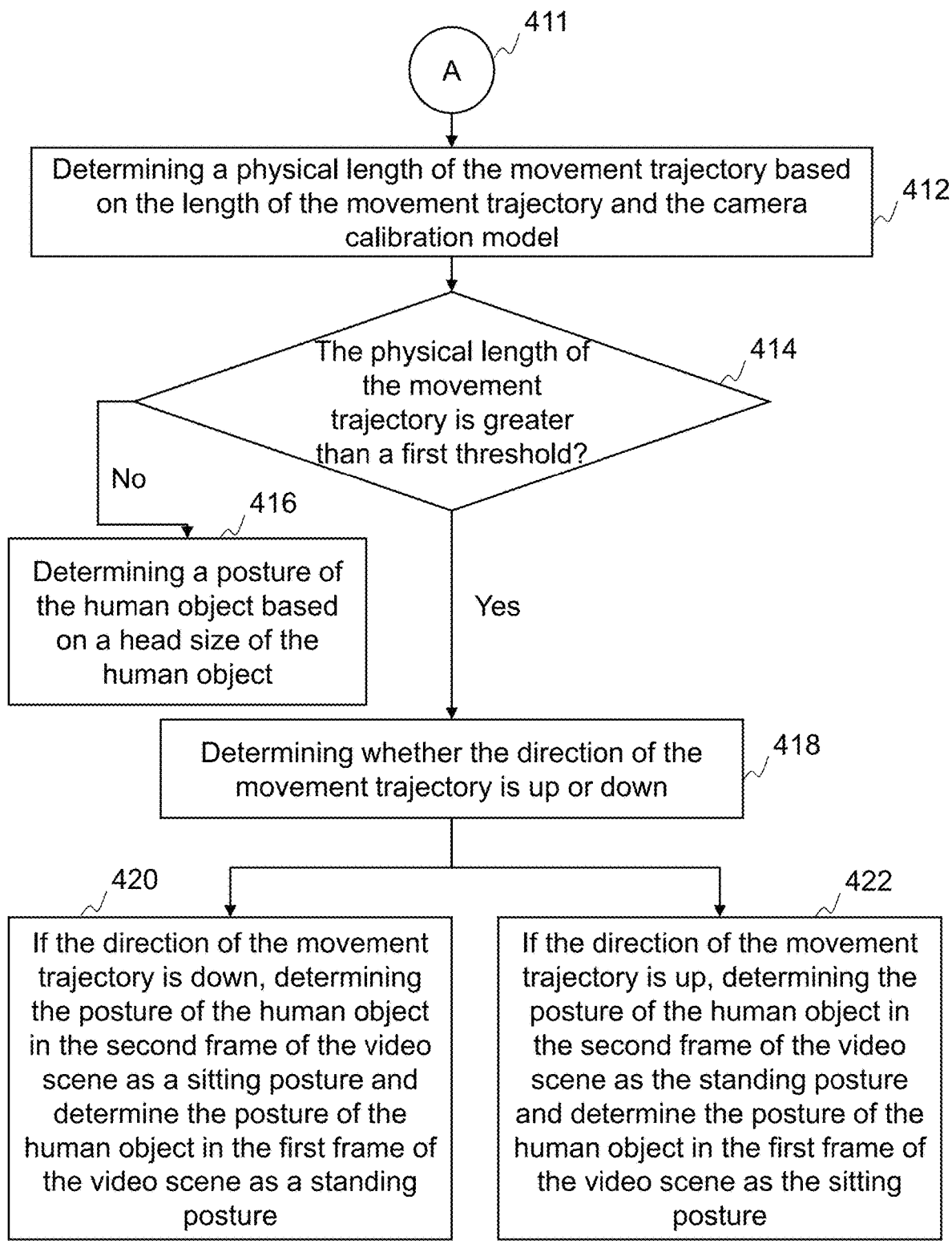
FIG. 4-B

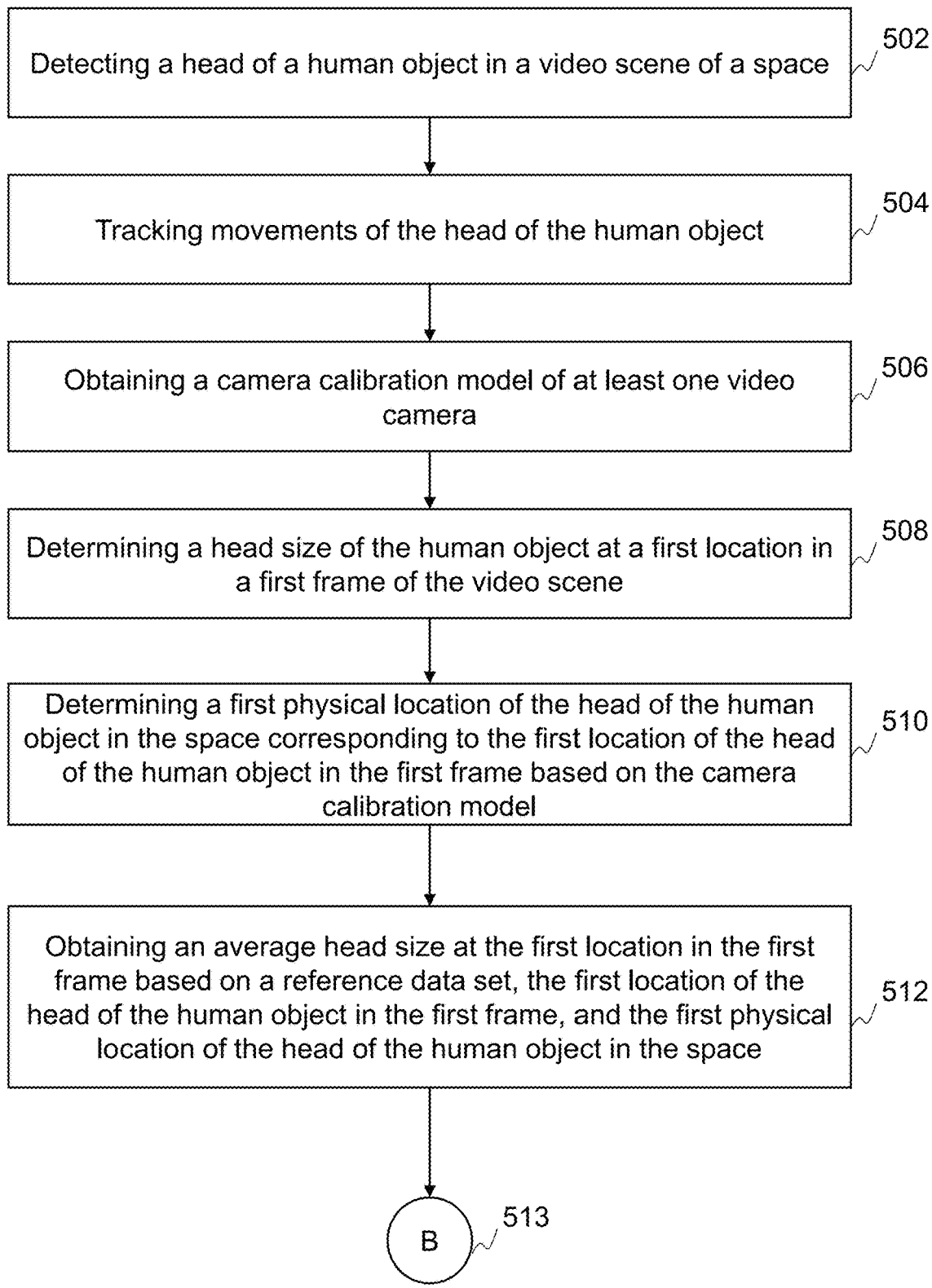
FIG. 5-A

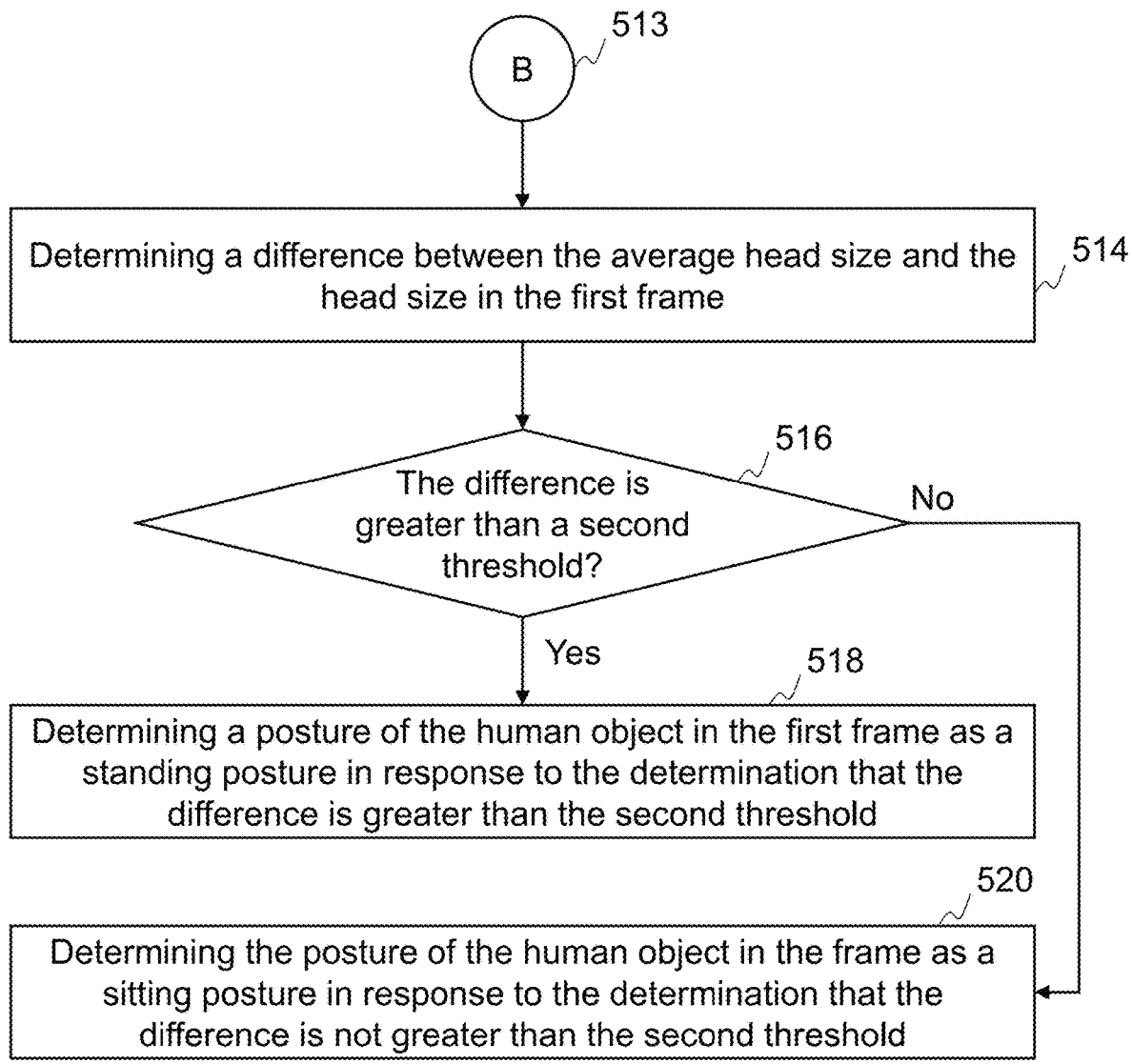
FIG. 5-B

SYSTEMS AND METHODS FOR DETECTING A POSTURE OF A HUMAN OBJECT

CROSS-REFERENCE TO RELATED APPLICATIONS

This application is a continuation of International Application No. PCT/CN2019/084381, filed on Apr. 25, 2019, which claims the priority of U.S. Provisional Patent Application No. 62/664,064, filed on Apr. 27, 2018, the entire contents of each of which are hereby incorporated by reference.

TECHNICAL FIELD

The present disclosure generally relates to motion detection in surveillance systems, and more specifically, to systems and methods for detecting a posture of a human object in a video.

BACKGROUND

Some video surveillance systems can automatically detect events of interest and potential threats in a scene. For example, such systems can detect and track an object entering or leaving an area (e.g., a restricted area, a store, an office building). In other applications, some further granularity, for example, the detection of a posture of a human object or a change in the posture of the human object, is needed. For instance, in a classroom equipped with a remote education system, detecting the postures of students and/or teachers in the classroom is important for monitoring the classroom. Therefore, it is desirable to provide systems and methods for detecting a posture of a human object (or a change in the posture of the human object) based on a video surveillance.

SUMMARY

According to an aspect of the present disclosure, a system for motion detection is provided. The system may include at least one storage medium that includes a set of instructions, and at least one processor in communication with the at least one storage medium. When executing the set of instructions, the at least one processor may be configured to cause the system to obtain data related to a video scene of a space from at least one video camera; detect an object in the video scene; classify the object as a human object or a non-human object; when the object is classified as a human object, track movements of the human object; and determine a posture of the human object in the video scene based on the movements of the human object.

In some embodiments, the at least one processor may further cause the system to detect a head of the human object in the video scene; track movements of the head of the human object; determine a movement trajectory of the head of the human object from a first location in a first frame to a second location in a second frame of the video scene; determine a length and a direction of the movement trajectory; obtain a camera calibration model of the at least one video camera; determine a physical length of the movement trajectory based on the length of the movement trajectory and the camera calibration model; and determine the posture of the human object in the video scene based on the direction of the movement trajectory and the physical length of the movement trajectory.

In some embodiments, the at least one processor may further cause the system to determine whether the physical length of the movement trajectory is greater than a first threshold; in response to the determination that the physical length of the movement trajectory is greater than the first threshold, determine whether the direction of the movement trajectory is up or down; if the direction of the movement trajectory is down, determine the posture of the human object in the second frame of the video scene as a sitting posture and determine the posture of the human object in the first frame of the video scene as a standing posture; and if the direction of the movement trajectory is up, determine the posture of the human object in the second frame of the video scene as the standing posture and determine the posture of the human object in the first frame of the video scene as the sitting posture.

In some embodiments, the at least one processor may further cause the system to determine a head size of the human object at the first location in the first frame; determine a first physical location of the head of the human object in the space corresponding to the first location of the head of the human object in the first frame based on the camera calibration model; obtain an average head size at the first location in the first frame based on a reference data set, the first location of the head of the human object in the first frame, and the first physical location of the head of the human object in the space, wherein the average head size at the first location may correspond to an average value of the head sizes of a plurality of human objects in the sitting posture; determine a difference between the average head size and the head size in the first frame; determine whether the difference is greater than a second threshold; determine the posture of the human object in the first frame as the standing posture in response to the determination that the difference is greater than the second threshold; and determine the posture of the human object in the first frame as the sitting posture in response to the determination that the difference is not greater than the second threshold.

In some embodiments, the camera calibration model may be generated based on a learning process, and the learning process may include obtaining sample data related to the video scene of the space, the sample data being associated with a plurality of human objects in the sitting posture; detecting a plurality of heads of the plurality of human objects; tracking movements of the plurality of heads; determining a plurality of average head sizes of the plurality of human objects at a plurality of respective locations in the sitting posture in a sample frame of the video scene; determining a plurality of average physical head sizes of the plurality of human objects at a plurality of respective physical locations in the sitting posture in the space; and generating the camera calibration model by associating the plurality of average head sizes at the plurality of respective locations in the sample frame with the plurality of average physical head sizes at the plurality of respective physical locations in the space.

In some embodiments, the at least one processor may further cause the system to determine a role of the human object in the space based at least in part on behaviors of the human object using a neural network model.

In some embodiments, the at least one processor may further cause the system to perform at least one of determining motion features related to the object; determining background changes in the video scene; or determining human features related to the object.

According to another aspect of the present disclosure, a method is provided. The method may be implemented on a computing device that includes at least one processor and at least one computer-readable storage medium for motion detection. The method may include obtaining data related to a video scene of a space from at least one video camera; detecting an object in the video scene; classifying the object as a human object or a non-human object; when the object is classified as a human object, tracking movements of the human object; and determining a posture of the human object in the video scene based on the movements of the human object.

According to yet another aspect of the present disclosure, a non-transitory computer readable medium embodying a computer program product is provided. The computer program product may include instructions configured to cause a computing device to obtain data related to a video scene of a space from at least one video camera; detect an object in the video scene; classify the object as a human object or a non-human object; when the object is classified as a human object, track movements of the human object; and determine a posture of the human object in the video scene based on the movements of the human object.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4-A and FIG. 4-B illustrate a flowchart illustrating an exemplary process for determining a posture of a human object according to some embodiments of the present disclosure;

FIG. 5-A and FIG. 5-B illustrate a flowchart illustrating an exemplary process for determining a posture of a human object according to some embodiments of the present disclosure;

DETAILED DESCRIPTION

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular exemplary embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," and/or "module" used herein are one method to distinguish different components, elements, parts, section or assembly of different level in ascending order. However, the terms may be displaced by another expression if they achieve the same purpose.

Figure 9:
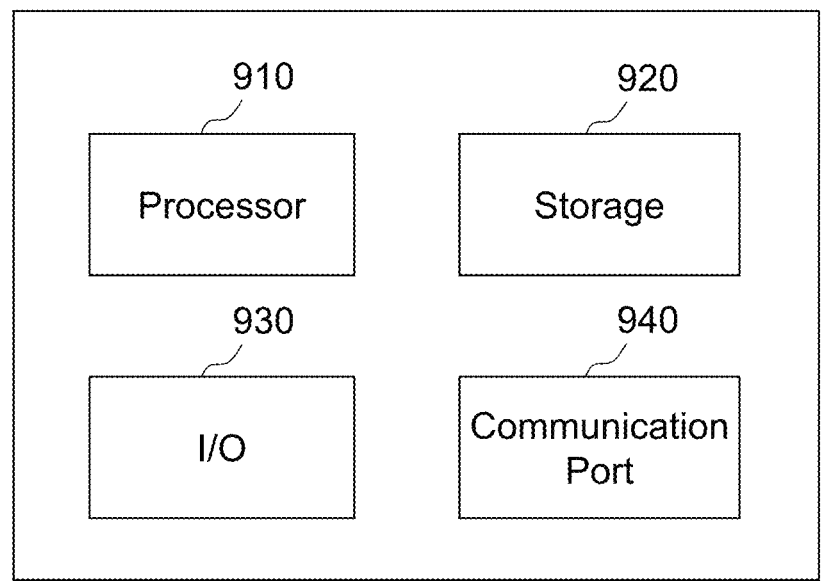
FIG. 9 is a schematic diagram illustrating exemplary hardware and/or software components of an exemplary computing device according to some embodiments of the present disclosure.

Generally, the word "module" or "unit" as used herein, refers to logic embodied in hardware or firmware, or to a collection of software instructions. A module or a unit described herein may be implemented as software and/or hardware and may be stored in any type of non-transitory computer-readable medium or another storage device. In some embodiments, a software module/unit may be compiled and linked into an executable program. It will be appreciated that software modules can be callable from other modules/units or from themselves, and/or may be invoked in response to detected events or interrupts. Software modules/units configured for execution on computing devices (e.g., processor 910 as illustrated in FIG. 9) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units may be included in connected logic components, such as gates and flip-flops, and/or can be included of programmable units, such as programmable gate arrays or processors. The modules/units or computing device functionality described herein may be implemented as software modules/units, but may be represented in hardware or firmware. In general, the modules/units described herein refer to logical modules/units that may be combined with other modules/units or divided into sub-modules/sub-units despite their physical organization or storage. The description may be applicable to a system, an engine, or a portion thereof.

It will be understood that when a unit, engine or module is referred to as being "on," "connected to," or "coupled to," another unit, engine, or module, it may be directly on, connected or coupled to, or communicate with the other unit, engine, or module, or an intervening unit, engine, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for detecting a posture (e.g., a sitting posture, a standing posture) of a human object based on a video related to the human object. According to the present disclosure, the systems and methods may determine the posture of the human object based on a physical length of a movement trajectory of the head of the human object between frames of the video. The systems and methods may determine the physical length of the movement trajectory based on the movement trajectory and a camera calibration model. The systems and methods may determine the camera calibration model based on a learning process. The systems and methods may also determine the posture of the human object based on a head size of the human object at a location in a frame of the video.

Figure 1:
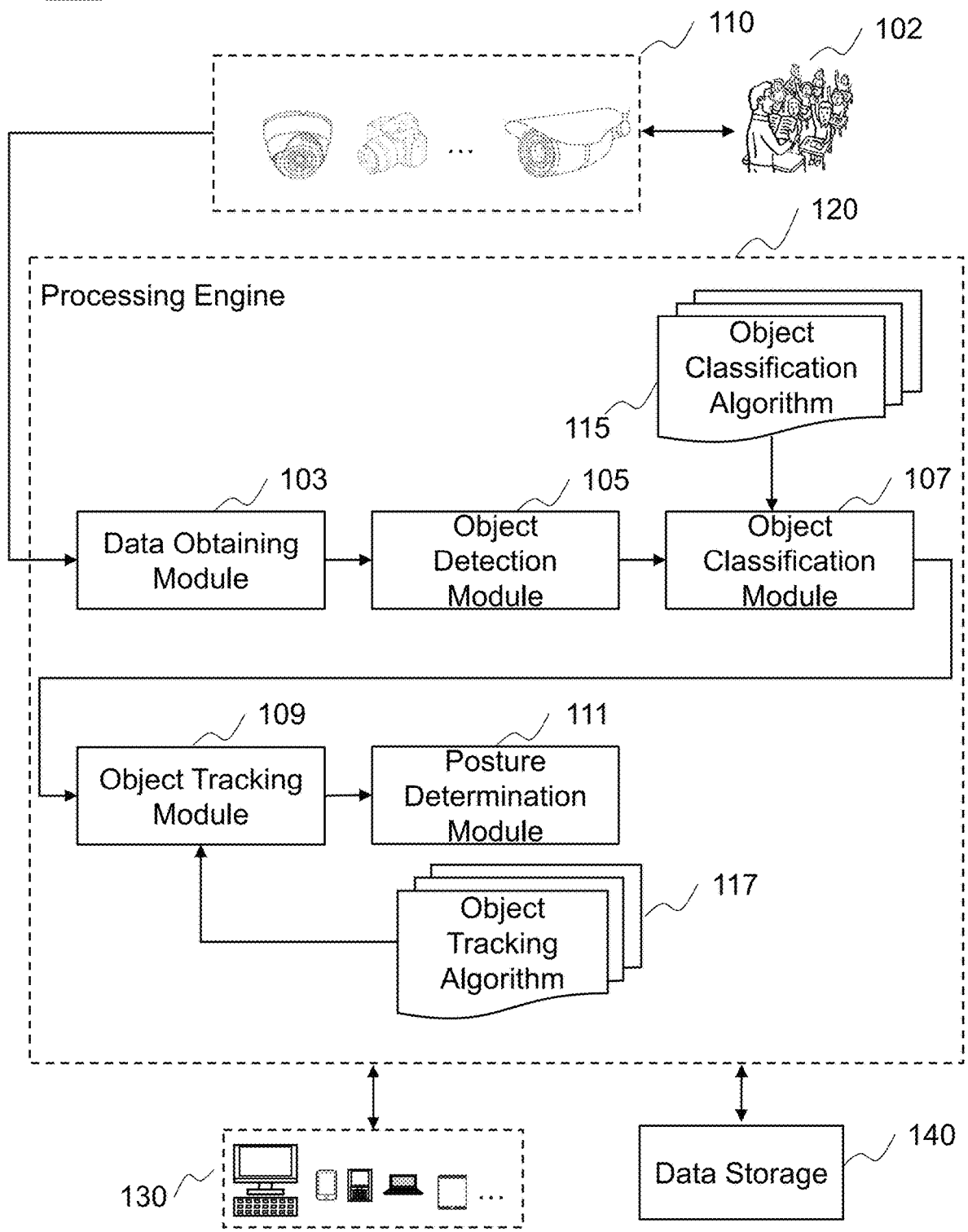
FIG. 1 is a schematic diagram illustrating an exemplary video surveillance system according to some embodiments of the present disclosure.

FIG. 1 is a schematic diagram illustrating an exemplary video surveillance system 100 according to some embodiments of the present disclosure. As illustrated in FIG. 1, the video surveillance system 100 may include at least one video camera 110, a processing engine 120, one or more terminals 130, and a data storage 140.

The video camera 110 may perform surveillance of a space 102. The space 102 may be an indoor space or an outdoor space. The indoor space may include a classroom, a store, an office, a warehouse, a hotel room, etc. The outdoor space may include a street, a park, etc. In some embodiments, the video camera 110 may capture data related to a video scene of the space 102. The video scene of the space 102 may include objects of interest in the space 102. For example, the space 102 may be an indoor space such as a classroom. The video scene of the classroom may include one or more human objects (e.g., teachers, students), one or more non-human objects (e.g., a desk, a projector, a blackboard, a television, walls, windows, etc.), etc. The data related to the video scene of the space 102 may include video data. The video data may include videos, images, audios, graphs, animations, etc. The video camera 110 may send the captured data related to the video scene of the space 102 to other components of the video surveillance system 100. In some embodiments, the video camera 110 may send the captured data related to the video scene of the space 102 to the processing engine 120 for processing. For example, the processing engine 120 may detect one or more human objects in the video scene of the space 102 based on the captured data. In some embodiments, the video camera 110 may send the captured data related to the video scene of the space 102 to the data storage 140 for storing.

In some embodiments, the video camera 110 may include a digital video camera, a color camera, a monochrome camera, a camera, a camcorder, a personal computer (PC) camera, a webcam, an infrared (IR) video camera, a closed-circuit television (CCTV) camera, an ultraviolet video camera, a thermal video camera, a pan-tile-zoom (PTZ) camera, a 4K video camera, or the like, or any combination thereof. The number of the at least one video camera 110 in the video surveillance system 100 is not limiting. Merely by way of example, the space 102 may be a classroom. The at least one video camera 110 may include two video cameras 110 to perform surveillance of the classroom. A first video camera 110 of the two video cameras 110 may monitor the students in the classroom, and a second video camera 110 of the two video cameras may monitor the blackboard and/or the teacher in the classroom.

The processing engine 120 may process data. The data may be obtained from other components of the video surveillance system 100 (e.g., the video camera 110, the terminal(s) 130, or the data storage 140). For example, the processing engine 120 may obtain video data related to the video scene of the space 102 from the video camera 110. By processing the video data, the processing engine 120 may detect an object in the video scene, classify the object, track movements of a classified human object, and/or determine a posture of the classified human object in the video scene. In some embodiments, the processing engine 120 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, as shown in FIG. 1, the processing engine 120 may include a data obtaining module 103, an object detection module 105, an object classification module 107, an object tracking module 109, and a posture determination module 111.

In some embodiments, the data obtaining module 103 may obtain data related to the video scene of the space 102 from the video camera 110. In some embodiments, the data related to the video scene of the space 102 may include videos. As used herein, a video may refer to motion pictures represented in analog and/or digital form. In some embodiments, the video may include multiple frames. A frame (also referred to as a video frame) may refer to a particular image, a still image or other discrete unit within a video. In some embodiments, the data obtaining module 103 may obtain the data related to the video scene from the video camera 110 via a direct connection between the video camera 110 and the data obtaining module 103. The direct connection may include, for example, a universal serial bus (USB) interface, an IEEE1394 interface, an RS-232 interface, etc. In some embodiments, the data obtaining module 103 may obtain the data related to the video scene from the video camera 110 via a network including, for example, the Internet, a local area network (LAN), a wide area network (WAN), or the like, or any combination thereof.

In some embodiments, the data obtaining module 103 may transmit the data related to the video scene of the space 102 to other components of the processing engine 120 (and/or the video surveillance system 100) for processing. For example, the data obtaining module 103 may transmit the data related to the video scene of the space 102 to the object detection module 105 for detecting an object in the video scene. As another example, the data obtaining module 103 may transmit the data related to the video scene of the space 102 to the data storage 140 for storing.

The object detection module 105 may detect an object in the video scene of the space 102. The object may be a human object or a non-human object. For example, the space 102 may be a classroom. The object may include a person, a desk, a projector, a television, a blackboard, a wall, a window, etc. In some embodiments, the object detection module 105 may transfer the detected object to the object classification module 107.

In some embodiments, the object detection module 105 may detect an object in the video related to the video scene that is obtained from the data obtaining module 103. In some embodiments, the object detection module 105 may detect the object in the video related to the video scene based on motion features related to the object. The video may include multiple frames. The motion features of the object may include an appearance of the object in the multiple frames, a disappearance of the object in the multiple frames, movements of the object between the multiple frames, etc. When the object detection module 105 determines or detects at least one motion feature in the multiple frames, an object may be detected. In some embodiments, the object detection module 105 may determine the motion features related to the object using a motion detection algorithm including, for example, a three-frame difference algorithm. In some embodiments, the object detection module 105 may detect the object in the video based on background changes in the video scene. The object detection module 105 may build a background image based on incoming video frames obtained from the data obtaining module 103. The background changes may include changes to the background image, i.e., the background image may be dynamic. The dynamic background image may be continuously built and updated based on the incoming video frames. When the pixels of a new background image are different from a previously built background image, the object detection module 105 may detect an object. In some embodiments, the object detection module 105 may determine the background changes in the video scene using a change detection algorithm including, for example, a stochastic background modeling algorithm. In some embodiments, the object detection module 105 may detect the object in the video related to the video scene based on external features related to the object. The external features may include human features such as a human head, a human face, a human skin, a hand, an arm, a finger, a thumb, a human foot, an elbow, a knee, etc. For example, when the object detection module 105 determines one or more human features in the video related to the video scene, the object detection module 105 may detect an object (e.g., a person) in the video scene. The external features may also include edge features. For example, when the object detection module 105 determines a region with four edges in the video related to the video scene, the object detection module 105 may detect an object (e.g., a blackboard, a television) in the video scene. In some embodiments the object detection module 105 may determine the external features related to the object using algorithms including, for example, a skin tone detection algorithm, a face detection algorithm, a head detection algorithm, an edge detection algorithm, etc.

The object classification module 107 may classify the object detected by the object detection module 105. In some embodiments, the object classification module 107 may classify the object as a human object or a non-human object. In some embodiments, the object classification module 107 may classify the object as a human object based on human features (e.g., a human head, a human face, a human skin, a hand, an arm, a finger, a thumb, a human foot, an elbow, a knee) of the human object. In some embodiments, the object classification module 107 may classify the object detected by the object detection module 105 using an object classification algorithm 115. In some embodiments, the object classification algorithm 115 may include a neural network algorithm, a linear discriminant algorithm, a decision tree algorithm, a naive Bayes algorithm, etc. In some embodiments, the object classification module 107 may transfer the classified human object to the object tracking module 109 for tracking movements of the human object.

In some embodiments, the object classification module 107 may also determine a role of the human object based on behaviors of the human object using a neural network model. For example, the space 102 may be a classroom. The object classification module 107 may determine a human object that often moves around the platform of the classroom as a teacher using the neural network model. The object classification module 107 may determine human objects dressed with clothes of the same color as students using the neural network model. In some embodiments, the neural network model may be trained using historical data (e.g., historical video data within the past two months) of the video surveillance system 100. In some embodiments, the object classification module 107 may also determine a face detection algorithm using the historical data. The object classification module 107 may rapidly determine the role of the human object using the face detection algorithm.

The object tracking module 109 may track movements of the human object classified by the object classification module 107. In some embodiments, the object tracking module 109 may track the movements of an entire body of the human object in the multiple frames of the video related to the video scene. For example, the object tracking module 109 may track the body contour of the human object in the multiple frames. As another example, the object tracking module 109 may track an estimated gravity canter of the human object in the multiple frames. As a further example, the object tracking module 109 may track the center of the body contour of the human object in the multiple frames. In some embodiments, the object tracking module 109 may track the movements of a portion of the human object (e.g., the head of the human object) in the multiple frames of the video related to the video scene. For example, the object tracking module 109 may track the contour of the head of the human object in the multiple frames. As another example, the object tracking module 109 may track the center of the contour of the head of the human object in the multiple frames. The object tracking module 109 may determine a match relationship of the human object in the multiple frames to track the movements of the human object. In some embodiments, the object tracking module 109 may track the movements of the human object based on an object tracking algorithm 117. The object tracking algorithm 117 may include an estimation-based tracking algorithm, a feature-based tracking algorithm, a model-based tracking algorithm, an area-based tracking algorithm, a motion contour-based tracking algorithm, or the like, or a combination thereof. The estimation-based tracking algorithm may include a Kalman filtering algorithm, a particle filtering algorithm, etc. The feature-based tracking algorithm may apply a feature (e.g., shape, texture, color, edge, etc.) of an object to track the object. The area-based tracking algorithm may include a Camshift algorithm, a kernel-based tracking algorithm, a trust-region tracking algorithm, etc. The motion contour-based tracking algorithm may include applying a Snake model, a Hidden Markov model (HMM), etc. In some embodiments, the object tracking module 109 may transfer the tracked human object to the posture determination module 111 for determining a posture of the human object.

The posture determination module 111 may determine a posture of the human object (the human object that is classified by the object classification module 107 and/or tracked by the object tracking module 109) in the video scene of the space 102. The posture of the human object may refer to a position in which the human object holds the body upright against gravity. The posture of the human object may include a sitting posture, a standing posture, or a lying posture. The posture determination module 111 may determine the posture of the human object in the video scene based on the video related to the video scene. In some embodiments, the posture determination module 111 may determine the posture of the human object based on a movement trajectory of the head of the human object between frames and a camera calibration model. In some embodiments, the posture determination module 111 may determine the posture of the human object based on a head size of the human object at a location in a frame of the video. Detailed descriptions of the posture determination module 111 and the determination of the posture of the human object will be found in FIG. 3 and the descriptions thereof.

The terminal(s) 130 may be connected to and/or communicate with the video camera 110, the processing engine 120, and/or the data storage 140. For example, the terminal(s) 130 may obtain a processed video frame from the processing engine 120. As another example, the terminal(s) 130 may obtain video data acquired via the video camera 110 and transmit the video data to the processing engine 120. In some embodiments, the terminal(s) 130 may include a mobile device, a tablet computer, a laptop computer, or the like, or any combination thereof. For example, the mobile device may include a mobile phone, a personal digital assistance (PDA), a gaming device, a navigation device, a point of sale (POS) device, a laptop, a tablet computer, a desktop, or the like, or any combination thereof. In some embodiments, the terminal(s) 130 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing engine 120 for further processing. Other types of the input device may include a cursor control device, such as a mouse, a trackball, or cursor direction keys, etc. The output device may include a display, a speaker, a printer, or the like, or any combination thereof. The display may display information. The information may include text, audios, videos, images, or the like, or any combination thereof. For example, the captured video from the video camera 110 may be displayed on a window of the display. As another example, the display may display the processed video data obtained from the processing engine 120 with graphics (e.g., a square icon, a line) to highlight one or more objects, such as a student in a standing posture, or a teacher. In some embodiments, the display may include a plurality of windows to display different information respectively. For example, one window of the display may display a panoramic scene of a classroom in one resolution and at least one other window of the display may display a partial scene focused on at least one human object in a standing posture in a different resolution. In some embodiments, the display may include a liquid crystal display (LCD), a light-emitting diode display (LED), an organic light emitting diode display (OLED), a quantum LED display (QLED), a flat panel display or curved screen, a cathode ray tube (CRT), a 3D display, a plasma display panel, a touchscreen, or the like, or any combination thereof.

The data storage 140 may store data. The data may be obtained from the video camera 110, the processing engine 120, the terminal(s) 130, and/or any other components of the video surveillance system 100. The data may include image data, video data, metadata associated with the image data and the video data, instruction data, etc. In some embodiments, the data storage 140 may be connected to and/or communicate with the processing engine 120. The processing engine 120 may access the data stored in the data storage 140. For example, the data storage 140 may store historical video data obtained from the data obtaining module 103. The object classification module 107 may train a neural network model based on the historical video data stored in the data storage 140. The neural network model may be used for the classification of a human object or a non-human object and/or the determination of a role of a human object (e.g., a teacher, a student). In some embodiments, the data storage 140 may include a hard disk drive, a solid-state drive, a removable storage drive (e.g., a flash memory disk drive, an optical disk drive, etc.), a digital video recorder, or the like, or any combination thereof.

The components in the video surveillance system 100 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the processing engine 120 may also include a storage module configured to store data obtained from other components of the processing engine 120 (e.g., the data obtaining module 103, the object detection module 105).

Figure 2:
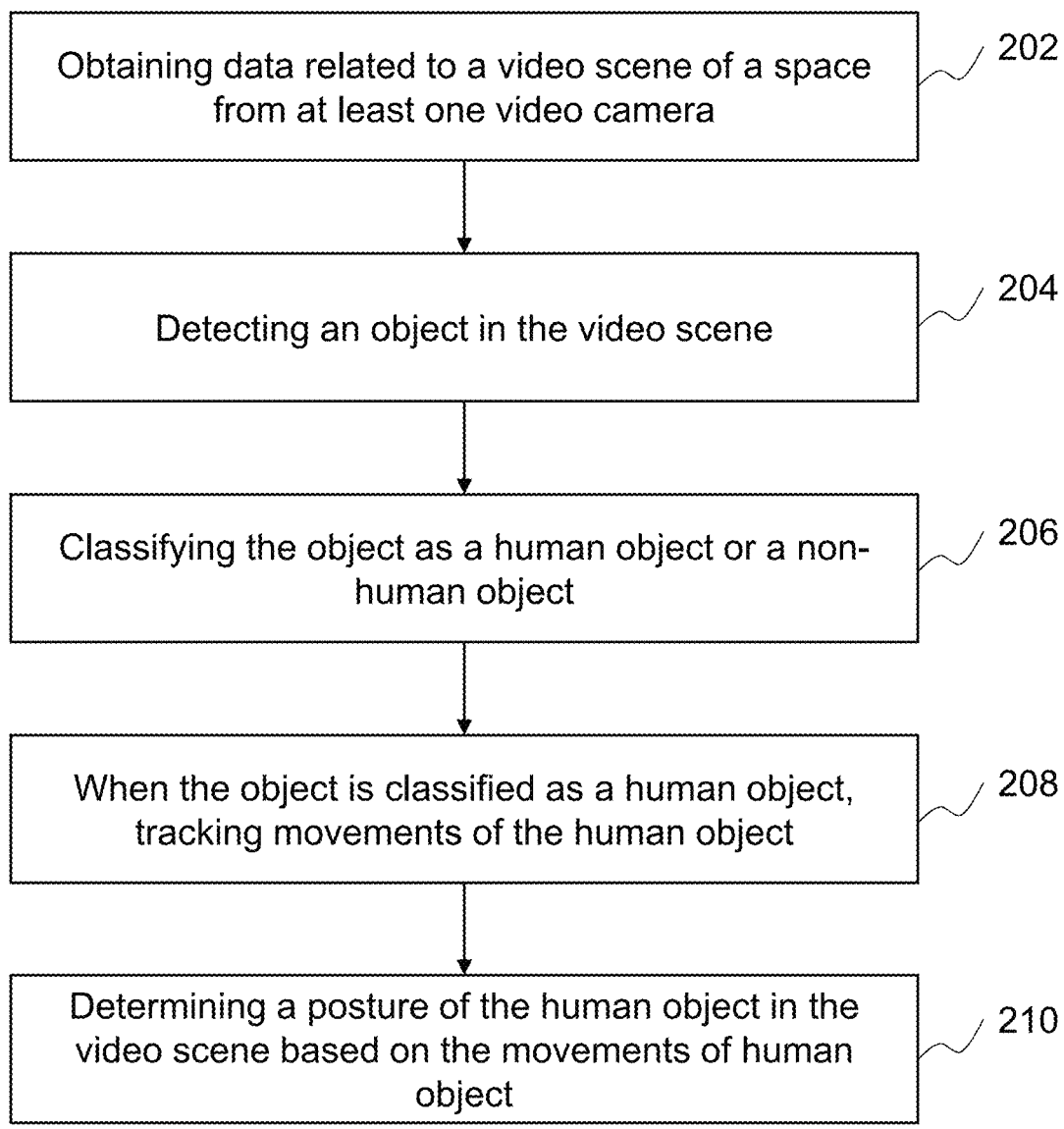
FIG. 2 is a flowchart illustrating an exemplary process for processing video data according to some embodiments of the present disclosure.

FIG. 2 a flowchart illustrating an exemplary process 200 for processing video data according to some embodiments of the present disclosure. The process 200 may be implemented in the video surveillance system 100 (and/or the video surveillance system 800 illustrated in FIG. 8). For example, the process 200 may be stored in the data storage 140 as a set of instructions, and invoked and/or executed by the processing engine 120 (e.g., one or more modules in the processing engine 120 illustrated in FIG. 1, the processor 910 of the computing device 900 illustrated in FIG. 9, the CPU 1008 or GPU 1006 of the mobile device 1000 illustrated in FIG. 10). The operations of the illustrated process presented below are intended to be illustrative. In some embodiments, the process 200 may be accomplished with one or more additional operations not described and/or without one or more of the operations discussed. Additionally, the order in which the operations of the process as illustrated in FIG. 2 and described below is not intended to be limiting.

In 202, the data obtaining module 103 may obtain data related to a video scene of a space (e.g., the space 102 illustrated in FIG. 1) from at least one video camera (e.g., the video camera 110 illustrated in FIG. 1). In some embodiments, the data related to the video scene of the space may include a video. The video may include multiple frames. For example, the space may be a classroom. The data obtaining module 103 may obtain the video related to the video scene of the classroom from at least one video camera positioned in front of the classroom and at least one video camera positioned at the back of the classroom.

In 204, the object detection module 105 may detect an object in the video scene. In some embodiments, the object detection module 105 may detect the object in the video including multiple frames related to the video scene. In some embodiments, the object detection module 105 may detect the object in the video scene based on motion features related to the object, background changes in the video scene, and/or external features related to object. Detailed descriptions of the detection of the object may be found elsewhere in the present disclosure (e.g., FIG. 1 and the descriptions thereof).

In 206, the object classification module 107 may classify the object as a human object or a non-human object. In some embodiments, the object classification module 107 may classify the object as a human object based on human features (e.g., a human head, a human face, a human skin, a hand, an arm, a finger, a thumb, a human foot, an elbow, a knee) of the human object. In some embodiments, the object classification module 107 may classify the object as a human object or a non-human object based on the object classification algorithm 115 as described elsewhere in the present disclosure (e.g., FIG. 1 and the descriptions thereof).

In 208, when the object is classified as a human object, the object tracking module 109 may track movements of the human object. In some embodiments, the object tracking module 109 may track the movements of an entire body of the human object in multiple frames of the video related to the video scene. For example, the object tracking module 109 may track the body contour of the human object in the multiple frames. As another example, the object tracking module 109 may track an estimated gravity canter of the human object in the multiple frames. As a further example, the object tracking module 109 may track the center of the body contour of the human object in the multiple frames. In some embodiments, the object tracking module 109 may track the movements of a portion of the human object (e.g., the head of the human object) in the multiple frames of the video related to the video scene. For example, the object tracking module 109 may track the contour of the head of the human object in the multiple frames. As another example, the object tracking module 109 may track the center of the contour of the head of the human object in the multiple frames. In some embodiments, the object tracking module 109 may track the movements of the human object based on the object tracking algorithm 117 illustrated in FIG. 1.

In 210, the posture determination module 111 may determine a posture of the human object in the video scene based on the movements of the human object. The posture of the human object may include a sitting posture, a standing posture, etc. The posture determination module 111 may determine the posture of the human object in the video scene based on the video related to the video scene. In some embodiments, the posture determination module 111 may determine the posture of the human object based on a movement trajectory of the head of the human object between frames and a camera calibration model. In some embodiments, the posture determination module 111 may determine the posture of the human object based on a head size of the human object at a location in a frame and an average head size at the location in the frame. Detailed descriptions of the determination of the posture of the human object will be found in FIG. 3, FIG. 4-A, FIG. 4-B and/or FIG. 5 and the descriptions thereof.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the process 200 may include storing intermediate data (e.g., the data related to the video scene, the result of the classification, etc.) generated during operations 202-210.

Figure 3:
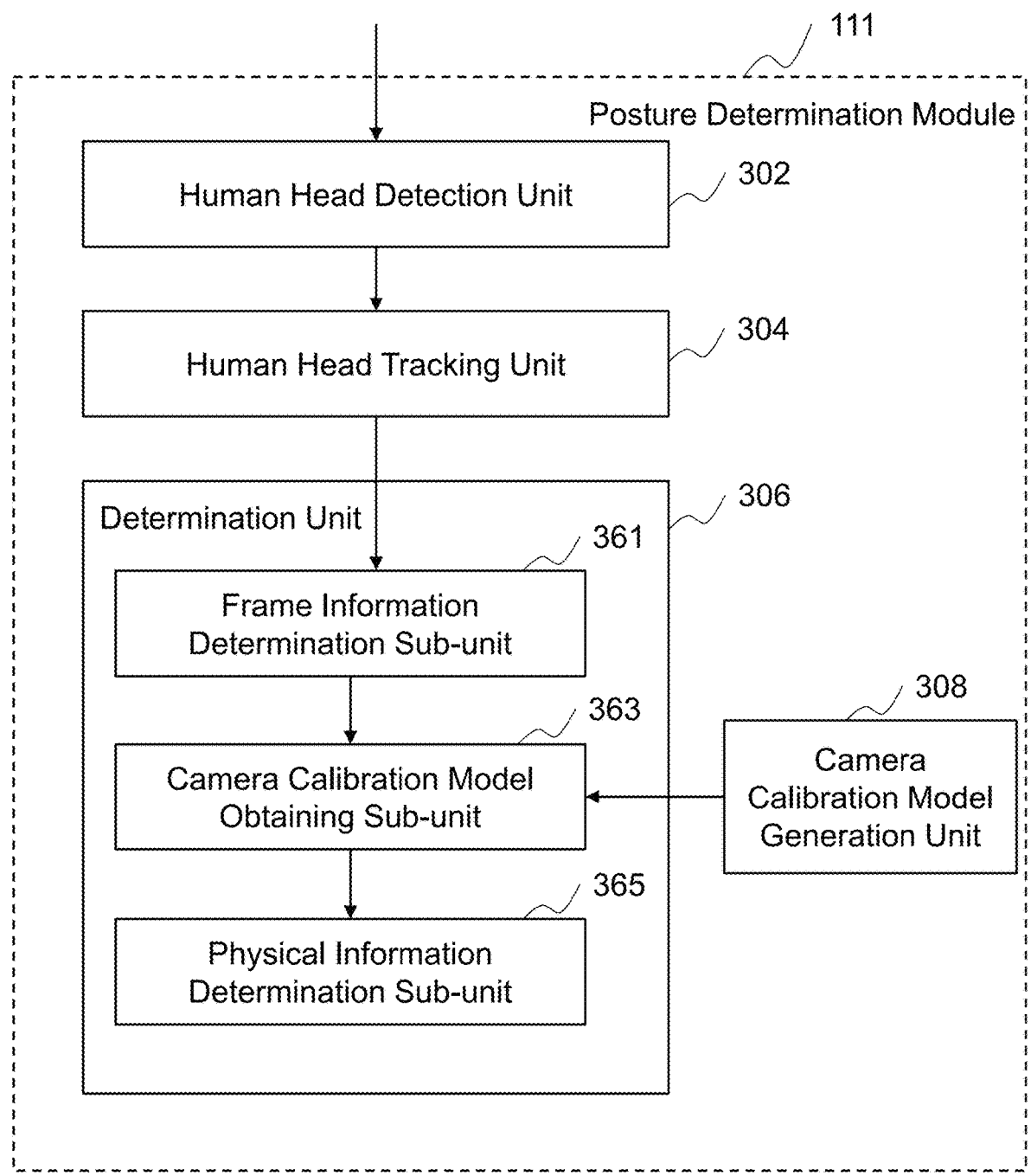
FIG. 3 is a schematic diagram illustrating an exemplary posture determination module according to some embodiments of the present disclosure.

FIG. 3 is a schematic diagram illustrating an exemplary posture determination module 111 according to some embodiments of the present disclosure. The posture determination module 111 may include a human head detection unit 302, a human head tracking unit 304, a determination unit 306, and a camera calibration model generation unit 308. In some embodiments, the human head detection unit 302, the human head tracking unit 304, the determination unit 306, and/or the camera calibration model generation unit 308 may be connected to and/or communicate with each other via a wireless connection (e.g., a network), a wired connection, or a combination thereof.

The human head detection unit 302 may detect a head of a human object in a video scene of a space (e.g., a classroom). In some embodiments, the human head detection unit 302 may detect the head of the human object in the video scene based on data related to the video scene. The data related to the video scene may be a video including multiple frames obtained from other components of the processing engine 120. For example, the human head detection unit 302 may detect the head of the human object in the multiple frames transferred from the object tracking module 109. In some embodiments, the human head detection unit 302 may detect the head of the human object in the multiple frames based on features of the head such as the shape of the head, or the location of the head. For example, the shape of the head of the human object in the multiple frames may seem like an ellipse. As another example, the head of the human object may be always located at the top of the human object. In some embodiments, the human head detection unit 302 may be connected to and/or communicate with other components of the posture determination module 111. For example, the human head detection unit 302 may transfer the detected head of the human object to the human head tracking unit 304 for tracking the head of the human object.

The human head tracking unit 304 may track movements of the head of the human object detected by the human head detection unit 302. The human head tracking unit 304 may track the movements of the head of the human object in the multiple frames. For example, the human head tracking unit 304 may track the contour of the head of the human object in the multiple frames. As another example, the human head tracking unit 304 may track the center of the contour of the head of the human object in the multiple frames. In some embodiments, the human head tracking unit 304 may track the movements of the head of the human object based on the object tracking algorithm 117 illustrated in FIG. 1. In some embodiments, the human head tracking unit 304 may be connected to and/or communicate with other components of the posture determination module 111. For example, the human head tracking unit 304 may transfer the tracked head of the human object to the determination unit 306 for determining a posture of the human object.

The determination unit 306 may determine a posture of the human object tracked by the human head tracking unit 304 and/or detected by the human head detection unit 302. As illustrated in FIG. 3, the determination unit 306 may include a frame information determination sub-unit 361, a camera calibration model obtaining sub-unit 363, and a physical information determination sub-unit 365.

The frame information determination sub-unit 361 may determine information of the head of the human object in the multiple frames. In some embodiments, the information of the head of the human object in the multiple frames may include a movement trajectory of the head of the human object. The movement trajectory may refer to a path that the head of the human object follows in the multiple frames. For example, the movement trajectory may include a movement trajectory of the head of the human object from a first location in a first frame to a second location in a second frame. In some embodiments, the first location in the first frame and the second location in the second frame may correspond to locations of the center of the contour of the head.

In some embodiments, the information of the head of the human object in the multiple frames may also include a length and a direction of a movement trajectory. For example, the frame information determination sub-unit 361 may determine the length and the direction of the movement trajectory from the first location in the first frame to the second location in the second frame. In some embodiments, the first location in the first frame may be represented as a coordinate value (x1, y1) in a two-dimensional (2D) image coordinate system (a coordinate system having an x axis and a y axis), and the second location in the second frame may be represented as a coordinate value (x2, y2) in the 2D image coordinate system. The 2D image coordinate system may be a coordinate system corresponding to an image or a frame. The movement trajectory may be represented as a vector from the coordinate value (x1, y1) to the coordinate value (x2, y2) in the 2D image coordinate. The length of the movement trajectory may refer to the magnitude of the vector, and the direction of the movement trajectory may refer to the direction of the vector denoted with an arrow. The direction of the vector may also be described by an angle between the vector and the positive half of the x axis. Detailed descriptions of the movement trajectory may be found in FIG. 4-A and/or FIG. 4-B and the description thereof.

In some embodiments, the information of the head of the human object in the multiple frames may also include a head size of the human object in the multiple frames, for example, a head size of the human object at the first location in the first frame, a head size of the human object at the second location in the second frame, etc. The shape of the head in the multiple frames may seem like an ellipse. The head size of the human object may include a length of the head corresponding to the major axis of the ellipse, and a width of the head corresponding to the minor axis of the ellipse.

The camera calibration model obtaining sub-unit 363 may obtain a camera calibration model of a video camera that captures the video related to the video scene. The camera calibration model of the video camera may refer to a mathematic representation of the conversion between physical information in a three-dimensional (3D) world coordinate system and information in the 2D image coordinate system. The 3D world coordinate system may be a coordinate system corresponding to a space. The physical information in the 3D world coordinate system may include information in the space such as a physical location in the space, a physical size in the space (e.g., a length in the space), etc. The information in the 2D image coordinate system may include information in the multiple frames such as a location in a frame, a size in a frame (e.g., a length at a location in the frame), etc. In some embodiments, the camera calibration model of the video camera may be represented as a camera matrix that includes intrinsic parameters and/or extrinsic parameters of the video camera. The intrinsic parameters of the video camera may include a focal length of the video camera, a principal point of the video camera, etc. The extrinsic parameters of the video camera may include a location and/or an orientation of the video camera installed in the space. In some embodiments, the camera calibration model obtaining sub-unit 363 may obtain the camera calibration model from the camera calibration model generation unit 308.

The physical information determination sub-unit 365 may determine physical information of the head of the human object in the space based on the camera calibration model transferred from the camera calibration model obtaining sub-unit 363 and the information of the head of the human object in the multiple frames transferred from the frame information determination sub-unit 361. The physical information of the head of the human object may include a physical location of the head in the space, a physical head size in the space (e.g., a physical length of the head in the space, a physical width of the head in the space), a physical length of the movement trajectory of the head in the space, etc. As described in connection with the frame information determination sub-unit 361, the movement trajectory of the head may be from the first location in the first frame to the second location in the second frame. The first location in the first frame may correspond to a first physical location in the space, and the second location in the second frame may correspond to a second physical location in the space. Therefore, the physical length of the movement trajectory may be the distance between the first physical location and the second physical location in the space. Detailed descriptions of the determination of the physical length of the movement trajectory may be found in FIG. 4-A and/or FIG. 4-B and the descriptions thereof.

In some embodiments, the determination unit 306 may determine the posture of the human object based on the movement trajectory of the head of the human object. In some embodiments, the determination unit 306 may determine the posture of the human object based on the head sizes in the multiple frames. Detailed descriptions of the determination of the posture of the human object may be found in FIG. 4-A, FIG. 4-B, FIG. 5-A, and/or FIG. 5-B, and the descriptions thereof.

The camera calibration model generation unit 308 may generate or determine a camera calibration model of a video camera. In some embodiments, the camera calibration model generation unit 308 may generate the camera calibration model based on a learning processing. Detailed descriptions of the generation of the camera calibration model will be found in FIG. 6 and/or FIG. 7 and the descriptions thereof.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the human head detection unit 302 and the human head tracking unit 304 may be integrated into a single unit to detect and track the head of the human object.

FIG. 4-A and FIG. 4-B illustrate a flowchart illustrating an exemplary process 400 for determining a posture of a human object according to some embodiments of the present disclosure. The process 400 may be implemented in the video surveillance system 100 (and/or the video surveillance system 800 illustrated in FIG. 8). For example, the process 400 may be stored in the data storage 140 as a set of instructions, and invoked and/or executed by the processing engine 120 (e.g., one or more modules in the processing engine 120 illustrated in FIG. 1, the processor 910 of the computing device 900 illustrated in FIG. 9, the CPU 1008 or GPU 1006 of the mobile device 1000 illustrated in FIG. 10). The operations of the illustrated process presented below are intended to be illustrative. In some embodiments, the process 400 may be accomplished with one or more additional operations not described and/or without one or more of the operations discussed. Additionally, the order in which the operations of the process as illustrated in FIG. 4-A and FIG. 4-B and described below is not intended to be limiting.

In 402, the human head detection unit 302 may detect a head of a human object in a video scene of a space. In some embodiments, the human head detection unit 302 may detect the head of the human object in a video related to the video scene of the space. For example, the space may be a classroom. The human head detection unit 302 may detect a head of a human object in the video recording the video scene of the classroom (e.g., the students and/or teachers in the classroom). In some embodiments, the human head detection unit 302 may detect the head of the human object in the multiple frames of the video based on features of the head such as the shape of the head, or the location of the head. For example, the human head detection unit 302 may determine an ellipse shape in the multiple frames as the head of the human object. As another example, the human head detection unit 302 may determine an object that is always located at the top of the human object as the head of the human object.

In 404, the human head tracking unit 304 may track movements of the head of the human object. In some embodiments, the human head tracking unit 304 may track the movements of the head of the human object in the multiple frames. For example, the human head tracking unit 304 may track the contour of the head of the human object in the multiple frames. As another example, the human head tracking unit 304 may track the center of the contour of the head of the human object in the multiple frames. In some embodiments, the human head tracking unit 304 may track the movements of the head of the human object based on the object tracking algorithm 117 illustrated in FIG. 1.

In 406, the frame information determination sub-unit 361 may determine a movement trajectory of the head of the human object from a first location in a first frame to a second location in a second frame of the video scene. The movement trajectory may refer to a path that the head of the human object follows from the first location in the first frame to the second location in the second frame. In some embodiments, the first location in the first frame and the second location in the second frame may correspond to locations of the center of the contour of the head.

In 408, the frame information determination sub-unit 361 may determine a length and a direction of the movement trajectory. In some embodiments, the first location in the first frame may be represented as a coordinate value (x1, y1) in a 2D image coordinate system having an x axis and a y axis, and the second location in the second frame may be represented as a coordinate value (x2, y2) in the 2D image coordinate system. The movement trajectory may be represented as a vector from the coordinate value (x1, y1) to the coordinate value (x2, y2) in the 2D image coordinate system. The length of the movement trajectory may refer to the magnitude of the vector, i.e., the distance between the coordinate value (x1, y1) and the coordinate value (x2, y2). The direction of the movement trajectory may refer to the direction of the vector denoted with an arrow. In some embodiments, the direction of the vector may also be described by an angle between the vector and the positive half of the x axis of the 2D image coordinate system. When the angle is in a range between 0 degree and 180 degrees, the direction of the movement trajectory may be up. When the angle is in a range between 180 degrees and 360 degrees, the direction of the movement trajectory may be down.

In 410, the camera calibration model obtaining sub-unit 363 may obtain a camera calibration model of at least one video camera. The at least one video camera may capture the video related to the video scene of the space. In some embodiments, the camera calibration model obtaining sub-unit 363 may obtain the camera calibration model from the camera calibration model generation unit 308. The camera calibration model generation unit 308 may generate the camera calibration model based on a learning process using sample data related to the video scene of the space. The sample data may be associated with a plurality of human objects in a sitting posture. Detailed descriptions of the generation of the camera calibration model will be found in FIG. 6 and FIG. 7 and the descriptions thereof.

The processing engine 120 may proceed to node A 411 and perform at least some of operations starting from node A 411 illustrated in FIG. 4-B.

In 412, the physical information determination sub-unit 365 may determine a physical length of the movement trajectory based on the length of the movement trajectory and the camera calibration model. In some embodiments, the physical information determination sub-unit 365 may directly calculate the physical length of the movement trajectory based on the length of the movement trajectory determined in operation 408 and the camera calibration model.

In some embodiments, as described in connection with operation 406 and operation 408, the movement trajectory of the head may be from the first location in the first frame to the second location in the second frame. The first location in the first frame may be represented as a coordinate value (x1, y1) in the 2D image coordinate system, and the second location in the second frame may be represented as a coordinate value (x2, y2) in the 2D image coordinate system. The first location in the first frame may correspond to a first physical location in the space, and the second location in the second frame may correspond to a second physical location in the space. In some embodiments, the first physical location of the head in the space may be represented as a coordinate value (X1, Y1, Z1) in the 3D world coordinate system, and the second physical location of the head in the space may be represented as a coordinate value (X2, Y2, Z2) in the 3D world coordinate system. In some embodiments, the camera calibration model may be represented as a camera matrix including intrinsic parameters and/or extrinsic parameters of the at least one video camera. The physical information determination sub-unit 365 may calculate and determine the coordinate value (X1, Y1, Z1) through multiplying the coordinate value (x1, y1) by the camera matrix, and may calculate and determine the coordinate value (X2, Y2, Z2) through multiplying the coordinate value (x2, y2) by the camera matrix. The physical information determination sub-unit 365 may then determine the physical length of the movement trajectory in the space by calculating the distance between the coordinate value (X1, Y1, Z1) and the coordinate value (X2, Y2, Z2).

In 414, the determination unit 306 may determine whether the physical length of the movement trajectory is greater than a first threshold. The first threshold may be default settings of the video surveillance system 100, or may be adjusted under different situations.

In response to the determination that the physical length of the physical length of the movement trajectory is not greater than the first threshold, the processing engine 120 may determine a posture of the human object based on a head size of the human object in 416. Detailed descriptions of the determination of the posture of the human object based on the head size of the human object will be found in FIG. 5-A and/or FIG. 5-B and the descriptions thereof.

In response to the determination that the physical length of the movement trajectory is greater than the first threshold, the posture determination module 111 may further determine whether the direction of the movement trajectory is up or down in 418. If the direction of the movement trajectory is down (i.e., the angle corresponding to the movement trajectory is in a range between 180 degrees and 360 degrees), the posture determination module 111 may determine the posture of the human object in the second frame of the video scene as a sitting posture and determine the posture of the human object in the first frame of the video scene as a standing posture in 420. If the direction of the movement trajectory is up (i.e., the angle corresponding to the movement trajectory is in a range between 0 degree and 180 degrees), the posture determination module 111 may determine the posture of the human object in the second frame of the video scene as the standing posture and determine the posture of the human object in the first frame of the video scene as the sitting posture in 422.

In some embodiments, the space illustrated in the process 400 may be a classroom. By implementing the process 400, the posture determination module 111 may determine the postures of the students and/or the teachers. For example, when a student stands up to answer a question, the posture determination module 111 (and/or the video surveillance system 100) may determine a change of the posture of the student from the sitting posture to the standing posture.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, operation 406 and operation 408 may be combined into an independent step for determining the movement trajectory, and/or the length and the direction of the movement trajectory.

FIG. 5-A and FIG. 5-B illustrate a flowchart illustrating an exemplary process 500 for determining a posture of a human object according to some embodiments of the present disclosure. The process 500 may be implemented in the video surveillance system 100 (and/or the video surveillance system 800 illustrated in FIG. 8). For example, the process 500 may be stored in the data storage 140 as a set of instructions, and invoked and/or executed by the processing engine 120 (e.g., one or more modules in the processing engine 120 illustrated in FIG. 1, the processor 910 of the computing device 900 illustrated in FIG. 9, the CPU 1008 or GPU 1006 of the mobile device 1000 illustrated in FIG. 10). The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5-A and FIG. 5-B and described below is not intended to be limiting. In some embodiments, operation 416 in the process 400 may be implemented by performing one or more operations in the process 500.

In 502, the human head detection unit 302 may detect a head of a human object in a video scene of a space. In some embodiments, the human head detection unit 302 may detect the head of the human object in a video including multiple frames related to the video scene. Operation 502 may be similar to operation 402 in the process 400, and therefore the descriptions thereof are not repeated here.

In 504, the human head tracking unit 304 may track movements of the head of the human object. Operation 504 may be similar to operation 404 in the process 400, and therefore the descriptions thereof are not repeated here.

In 506, the camera calibration model obtaining sub-unit 363 may obtain a camera calibration model of at least one video camera. The at least one video camera may capture the video related to the video scene of the space. Operation 506 may be similar to operation 410 in the process 400, and therefore the descriptions thereof are not repeated here.

In 508, the frame information determination sub-unit 361 may determine a head size of the human object at a first location in a first frame of the video scene. The shape of the head in the multiple frames may be an ellipse. The head size of the human object may include a length of the head corresponding to the major axis of the ellipse, and a width of the head corresponding to the minor axis of the ellipse. In some embodiments, the first location in the first frame may correspond to a location of the center of the contour of the head.

In 510, the physical information determination sub-unit 365 may determine a first physical location of the head of the human object in the space corresponding to the first location of the head of the human object in the first frame based on the camera calibration model. In some embodiments, the first location in the first frame may be represented as a coordinate value (x, y) in a 2D image coordinate system. The first physical location of the head of the human object in the space may be represented as a coordinate value (X, Y, Z) in a 3D world coordinate system corresponding to the first location in the first frame. In some embodiments, the camera calibration model may be represented as a camera matrix including intrinsic parameters and/or extrinsic parameters of the at least one video camera. The physical information determination sub-unit 365 may determine the coordinate value (X, Y, Z) in the 3D world coordinate system through multiplying the coordinate value (x, y) by the camera matrix.

In 512, the determination unit 306 may obtain an average head size at the first location in the first frame based on a reference data set, the first location of the head of the human object in the first frame, and the first physical location of the head of the human object in the space. The average head size at the first location may correspond to an average value of the head sizes of a plurality of human objects in the sitting posture. The average head size may include an average value of the lengths of the heads of the plurality of human objects in the sitting posture, and/or an average value of the widths of the heads of the plurality of human objects in the sitting posture. As used herein, an average value of the lengths of the heads of the plurality of human objects in the sitting posture may be referred to as an average head length, and an average value of the widths of the heads of the plurality of human objects in the sitting posture may be referred to as an average head width. The reference data set may include a plurality of average head sizes of the plurality of human objects at a plurality of respective locations in the sitting posture in a frame, and a plurality of average physical head sizes of the plurality of human objects at a plurality of respective physical locations in the sitting posture in the space. An average head size at a location in the frame may correspond to an average physical head size at a physical location in the space. In some embodiments, the reference data set may be represented as and/or stored in various data structures including, for example, a lookup table, a stack, a tree, a graph, etc. According to the first location of the head of the human object in the first frame and the first physical location of the head of the human object in the space, the determination unit 306 may search the reference data set to obtain the average head size at the first location in the first frame. The reference data set may be generated based on a learning process. Detailed descriptions of the reference data set will be found in FIG. 7 and the descriptions thereof.

The processing engine 120 may proceed to node B 513 and perform at least some of operations starting from node B 513 illustrated in FIG. 5-B.

In 514, the posture determination module 111 may determine a difference between the average head size and the head size in the first frame. The difference may include a first difference between the average head length and the length of the head in the first frame, and a second difference between the average head width and the width of the head in the first frame.

In 516, the posture determination module 111 may determine whether the difference is greater than a second threshold. The second threshold may be default settings of the video surveillance system 100, or may be adjusted under different situations. In some embodiments, the posture determination module 111 may determine whether both the first difference and the second difference are greater than the second threshold.

In response to the determination that the difference is greater than the second threshold (i.e., both the first difference and the second difference are greater than the second threshold), the posture determination module 111 may determine a posture of the human object at the first location in the first frame as a standing posture in 518. On the other hand, in response to the determination that the difference is not greater than the second threshold (i.e., at least one of the first difference or the second difference is not greater than the second threshold), the posture determination module 111 may determine the posture of the human object at the first location in the first frame as a sitting posture in 520.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the order of operation 506 and operation 508 may be interchangeable.

Figure 6:
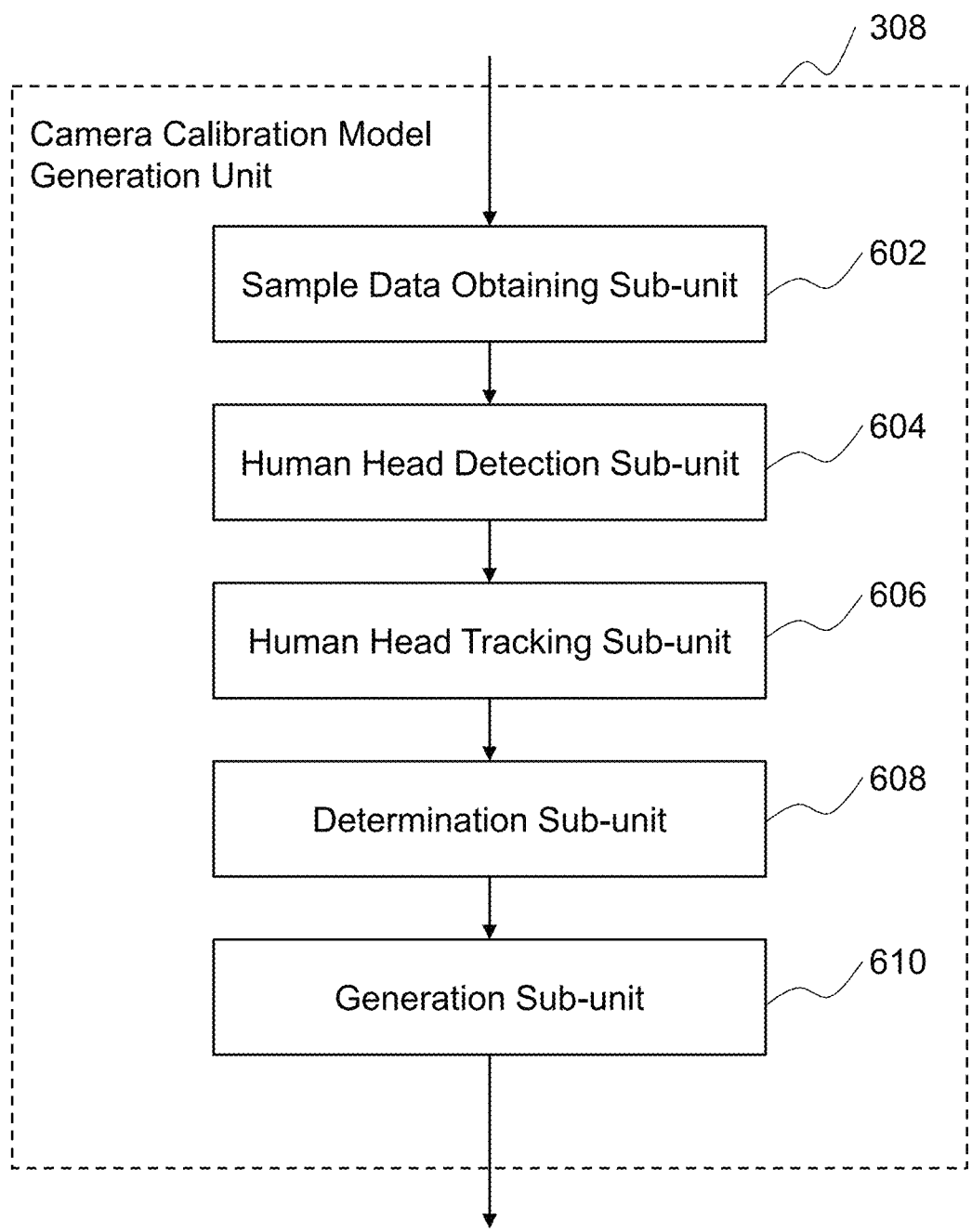
FIG. 6 is a schematic diagram illustrating an exemplary camera calibration model generation unit according to some embodiments of the present disclosure.

FIG. 6 is a schematic diagram illustrating an exemplary camera calibration model generation unit 308 according to some embodiments of the present disclosure. The camera calibration model generation unit 308 may include a sample data obtaining sub-unit 602, a human head detection sub-unit 604, a human head tracking sub-unit 606, a determination sub-unit 608, and a generation sub-unit 610. In some embodiments, the sample data obtaining sub-unit 602, the human head detection sub-unit 604, the human head tracking sub-unit 606, the determination sub-unit 608, and/or the generation sub-unit 610 may be connected to and/or communicate with each other via a wireless connection (e.g., a network), a wired connection, or a combination thereof.

The sample data obtaining sub-unit 602 may obtain sample data related to a video scene of a space. The sample data may be associated with a plurality of human objects in the sitting posture. For example, the space may be a classroom. The video scene of the classroom may include one or more students (and/or teachers) in the sitting posture. The sample data may include video data such as videos, images, audios, graphs, animations, etc. For example, the sample data may be a video that includes multiple frames. As used herein, a frame in the sample data may also be referred to as a sample frame. In some embodiments, the sample data obtaining sub-unit 602 may obtain the sample data from at least one video camera (e.g., the video camera 110). The at least one video camera installed in the space may capture the sample data related to the video scene of the space and transmit the captured sample data to the sample data obtaining sub-unit 602 via a direct connection or a network as described elsewhere in the present disclosure (e.g., FIG. 1 and the descriptions thereof). In some embodiments, the sample data obtaining sub-unit 602 may obtain the sample data from the data storage 140, or an external data storage (not shown). In some embodiments, the sample data obtaining sub-unit 602 may obtain the sample data within a time period (e.g., the past one hour, the past one day, the past one month, etc.). In some embodiments, the sample data obtaining sub-unit 602 may transfer the sample data related to the video scene of the space to the human head detection sub-unit 604 for detecting a plurality of heads of the plurality of human object.

The human head detection sub-unit 604 may detect a plurality of heads of the plurality of human objects. The human head detection sub-unit 604 may detect the plurality of heads of the plurality of human objects in the multiple frames of the sample data. In some embodiments, the human head detection sub-unit 604 may detect the plurality of heads of the plurality of human objects based on features of a head such as the shape of the head, or the location of the head. For example, the human head detection sub-unit 604 may determine an ellipse shape in the multiple frames as the head of a human object. As another example, the human head detection sub-unit 604 may determine an object that is always located at the top of the human object as the head of the human object. In some embodiments, the human head detection sub-unit 604 may be connected to and/or communicate with other components of the camera calibration model generation unit 308. For example, the human head detection sub-unit 604 may transfer the plurality of detected heads of the plurality of human objects to the human head tracking sub-unit 606 for tracking the plurality of heads.

The human head tracking sub-unit 606 may track movements of the plurality of heads detected by the human head detection sub-unit 604. The human head tracking sub-unit 606 may track the movements of the plurality of heads in the multiple frames. The human head tracking sub-unit 606 may be similar to the human head tracking unit 304 of FIG. 3, and therefore the descriptions thereof are not repeated here. In some embodiments, the human head tracking sub-unit 606 may transfer the plurality of tracked heads of the plurality of human objects to the determination sub-unit 608 for determining information of the plurality of heads.

The determination sub-unit 608 may determine a plurality of average head sizes of the plurality of human objects at a plurality of respective locations in the sitting posture in a sample frame of the sample data. An average head size of the plurality of human objects at a location in the sitting posture in the sample frame may include an average value of the lengths of the heads of the plurality of human objects at the location in the sitting posture, and/or an average value of the widths of the heads of the plurality of human objects at the location in the sitting posture. For each of the plurality of respective locations in the sample frame, the determination sub-unit 608 may determine an average head size of the plurality of human objects in the sitting posture in the sample frame using, for example, a statistical algorithm. Exemplary statistical algorithm may include a statistical median algorithm, a histogram algorithm, etc.

The determination sub-unit 608 may also determine a plurality of average physical head sizes of the plurality of human objects at a plurality of respective physical locations in the sitting posture in the space. An average physical head size of the plurality of human objects at a physical location in the sitting posture in the space may include an average value of the physical lengths of the heads of the plurality of human objects at the physical location in the space, and/or an average value of the physical widths of the heads of the plurality of human objects at the physical location in the space. For each of the plurality of respective physical locations in the space, the determination sub-unit 608 may determine an average physical head size of the plurality of human objects in the sitting posture in the space using, for example, a statistical algorithm (e.g., a statistical median algorithm, a histogram algorithm, etc.).

Each of the plurality of respective locations in the sample frame may correspond to one of the plurality of respective physical locations in the space. In some embodiments, each of the plurality of respective locations in the sample frame may be represented as a coordinate value (x, y) in a 2D image coordinate system, and each of the plurality of respective physical locations in the space may be represented as a coordinate value (X, Y, Z) in a 3D world coordinate system. In some embodiments, the determination sub-unit 608 may transfer the plurality of average head sizes at the plurality of respective locations in the sample frame and the plurality of average physical head sizes at the plurality of respective physical locations in the space to the generation sub-unit 610 for generating a camera calibration model.

The generation sub-unit 610 may generate a camera calibration model of a video camera (e.g., the video camera that captures the sample data). The generation sub-unit 610 may generate the camera calibration model by associating the plurality of average head sizes at the plurality of respective locations in the sample frame with the plurality of average physical head sizes at the plurality of respective physical locations in the space. An average head size at a location in the sample frame may correspond to an average physical head size at a physical location in the space. The generation sub-unit 610 may generate the camera calibration model based on determining the conversion relationship between the plurality of average head sizes at the plurality of respective locations in the sample frame and the plurality of average physical head sizes at the plurality of respective physical locations in the space. The camera calibration model of the video camera may refer to a mathematic representation of the conversion between physical information in the 3D world coordinate system and information in the 2D image coordinate system. The 3D world coordinate system may be a coordinate system corresponding to the space. The physical information in the 3D world coordinate system may include information in the space such as a physical location in the space, a physical size in the space (e.g., a length in the space), etc. The information in the 2D image coordinate system may include information in the multiple frames such as a location in a frame, a size in a frame (e.g., a length at a location in the frame), etc. In some embodiments, the camera calibration model of the video camera may be represented as a camera matrix that includes intrinsic parameters and/or extrinsic parameters of the video camera. The intrinsic parameters of the video camera may include a focal length of the video camera, a principal point of the video camera, etc. The extrinsic parameters of the video camera may include a location and/or an orientation of the video camera installed in the space.

In some embodiments, the plurality of average head sizes at the plurality of respective locations in the sample frame and the plurality of average physical head sizes at the plurality of respective physical locations in the space may form a reference data set. In some embodiments, the reference data set may be represented as and/or stored in various data structures including, for example, a lookup table, a stack, a tree, a graph, etc.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the human head detection sub-unit 604 and the human head tracking sub-unit 606 may be integrated into a single sub-unit to detect and track the plurality of heads.

Figure 7:
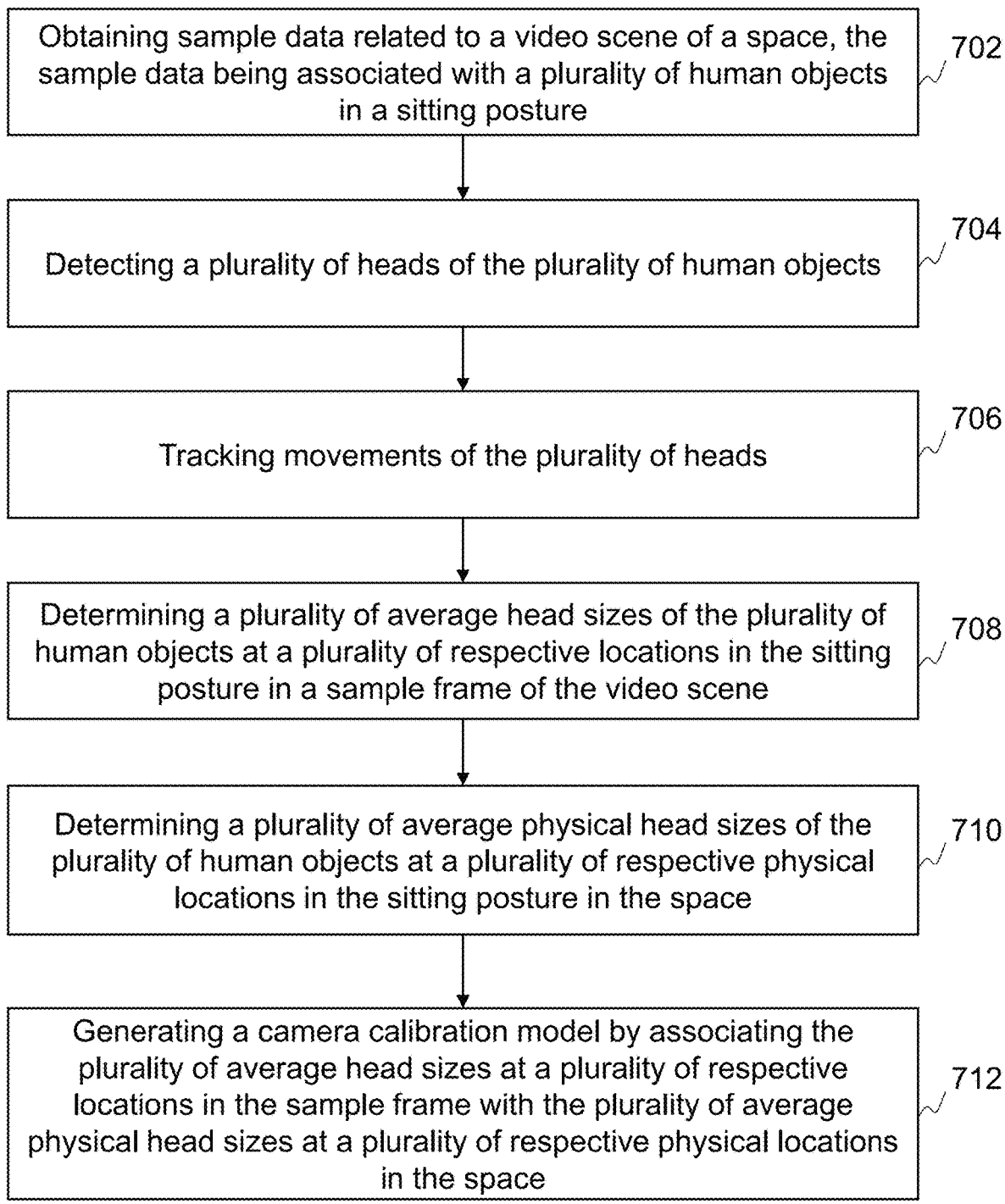
FIG. 7 is a flowchart illustrating an exemplary process for generating a camera calibration model according to some embodiments of the present disclosure.

FIG. 7 is a flowchart illustrating an exemplary process 700 for generating a camera calibration model according to some embodiments of the present disclosure. The process 700 may be implemented in the video surveillance system 100 (and/or the video surveillance system 800 illustrated in FIG. 8). For example, the process 700 may be stored in the data storage 140 as a set of instructions, and invoked and/or executed by the processing engine 120 (e.g., one or more modules in the processing engine 120 illustrated in FIG. 1, the processor 910 of the computing device 900 illustrated in FIG. 9, the CPU 1008 or GPU 1006 of the mobile device 1000 illustrated in FIG. 10). The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 702, the sample data obtaining sub-unit 602 may obtain sample data related to a video scene of a space. The sample data (e.g., a video including multiple frames) may be associated with a plurality of human objects in the sitting posture. In some embodiments, the sample data obtaining sub-unit 602 may obtain the sample data from at least one video camera that performs surveillance of the space. In some embodiments, the sample data obtaining sub-unit 602 may obtain the sample data from the data storage 140, a storage module in the processing engine 120 (not shown), or an external data source (not shown). In some embodiments, the sample data obtaining sub-unit 602 may obtain the sample data within a time period (e.g., the past one hour, the past one day, the past one month, etc.).

In 704, the human head detection sub-unit 604 may detect a plurality of heads of the plurality of human objects. The human head detection sub-unit 604 may detect the plurality of heads of the plurality of human objects in the multiple frames of the sample data. Operation 704 may be similar to operation 402 in the process 400, and therefore the descriptions thereof are not repeated here.

In 706, the human head tracking sub-unit 606 may track movements of the plurality of heads. The human head tracking sub-unit 606 may track the movements of the plurality of heads in the multiple frames. Operation 706 may be similar to operation 404 in the process 400, and therefore the descriptions thereof are not repeated here.

In 708, the determination sub-unit 608 may determine a plurality of average head sizes of the plurality of human objects at a plurality of respective locations in the sitting posture in a sample frame of the video scene. For each of the plurality of respective locations in the sample frame, the determination sub-unit 608 may determine an average head size of the plurality of human objects in the sitting posture in the sample frame using a statistical algorithm (e.g., a statistical median algorithm, a histogram algorithm).

In 710, the determination sub-unit 608 may determine a plurality of average physical head sizes of the plurality of human objects at a plurality of respective physical locations in the sitting posture in the space. For each of the plurality of respective physical locations in the space, the determination sub-unit 608 may determine an average physical head size of the plurality of human objects in the sitting posture in the space using the statistical algorithm.

In 712, the generation sub-unit 610 may generate a camera calibration model by associating the plurality of average head sizes at the plurality of respective locations in the sample frame with the plurality of average physical head sizes at the plurality of respective physical locations in the space. The camera calibration model may be a camera calibration model that captures the sample data. An average head size at a location in the sample frame may correspond to an average physical head size at a physical location in the space. The generation sub-unit 610 may generate the camera calibration model based on determining the conversion relationship between the plurality of average head sizes at the plurality of respective locations in the sample frame and the plurality of average physical head sizes at the plurality of respective physical locations in the space.

In some embodiments, the camera calibration model generation unit 308 may perform one or more operations in the process 700 (e.g., operation 708, operation 710) based on a machine learning algorithm including, for example, an instance-based learning algorithm, a regression analysis algorithm, a regularization algorithm, etc.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, operation 708 and operation 710 may be combined into an independent step.

Figure 8:
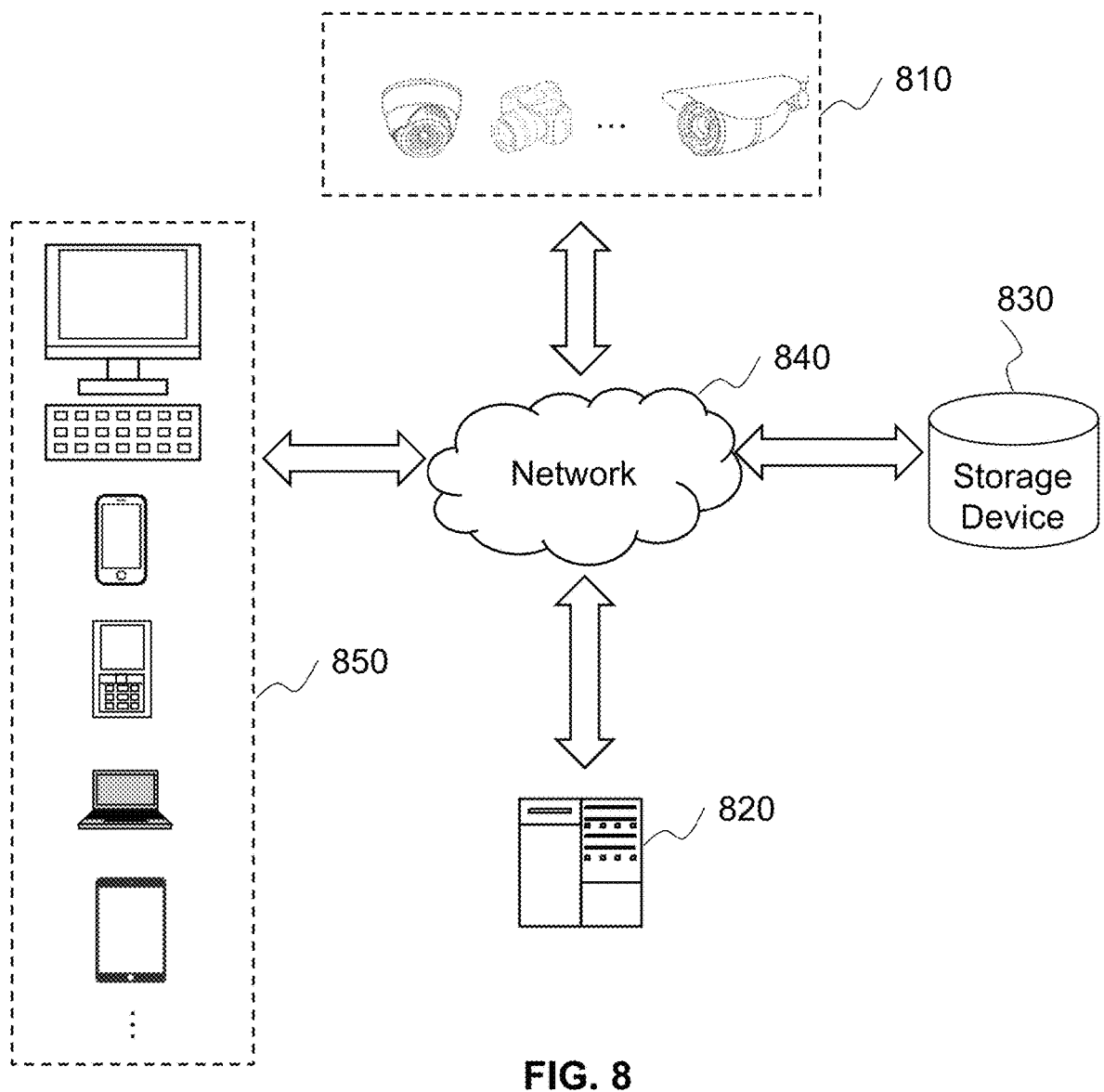
FIG. 8 is a schematic diagram illustrating an exemplary video surveillance system according to some embodiments of the present disclosure.

FIG. 8 is a schematic diagram illustrating an exemplary video surveillance system 800 according to some embodiments of the present disclosure. In some embodiments, the video surveillance system 800 may be used to implement one or more processes as described above, for example, the process 200, the process 400, the process 500, and/or the process 700. As shown in FIG. 8, the video surveillance system 800 may include one or more video cameras 810, a processing engine 820, a storage device 830, a network 840, and one or more terminals 850. In some embodiments, the video camera(s) 810, the processing engine 820, the storage device 830, and/or the terminal(s) 850 may be connected to and/or communicate with each other via a wireless connection (e.g., the network 840), a wired connection, or a combination thereof. The connection between the components in the video surveillance system 800 may be variable. Merely by way of example, the video camera(s) 810 may be connected to the processing engine 820 through the network 840, as illustrated in FIG. 8. As another example, the video camera(s) 810 may be connected to the processing engine 820 directly. As a further example, the storage device 830 may be connected to the processing engine 820 through the network 840, as illustrated in FIG. 8, or connected to the processing engine 820 directly. As still a further example, the terminal(s) 850 may be connected to the processing engine 820 through the network 840, as illustrated in FIG. 8, or connected to the processing engine 820 directly.

The video camera(s) 810 may be positioned to perform surveillance of a space and/or a video scene of the space. In some embodiments, the space may be an indoor space or an outdoor space. The indoor space may include, for example, a classroom, a store, an office, a warehouse, a hotel room, etc. The outdoor space may include, for example, a street, a park, etc. The video scene of the space may include objects of interest. For example, the space may be a classroom. The video scene of the classroom may include one or more human objects (e.g., teachers, students), and one or more non-human objects (e.g., a desk, a projector, a blackboard, a television, walls, windows).

The video camera(s) 810 may include one or more video cameras positioned in different locations of the space. For example, the space may be a classroom. There may be at least one video camera positioned in front of the classroom to monitor the students in the classroom, and there may be at least one video camera positioned at the back of the classroom to monitor the blackboard and/or teacher(s) in the classroom. In some embodiments, the video camera(s) 810 may include a digital video camera, a color camera, a monochrome camera, a camera, a camcorder, a personal computer (PC) camera, a webcam, an infrared (IR) video camera, a closed-circuit television (CCTV) camera, a thermal video camera, a pan-tile-zoom (PTZ) camera, a 4K video camera, or the like, or any combination thereof.

Figure 10:
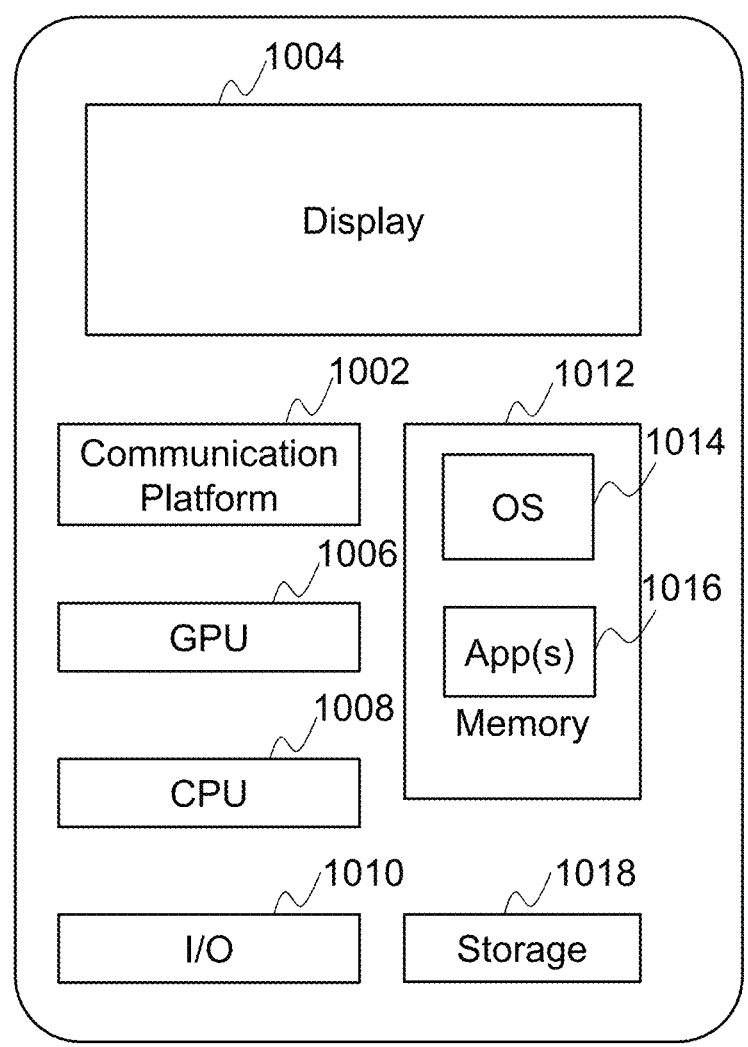
FIG. 10 is schematic diagram illustrating exemplary hardware and/or software components of an exemplary mobile device according to some embodiments of the present disclosure.

The processing engine 820 may process data and/or information obtained from the video camera(s) 810, the storage device 830, and/or the terminal(s) 850. For example, the processing engine 820 may determine a posture of a human object based on data collected by the video camera(s) 810. In some embodiments, the processing engine 820 may be a single server or a server group. The server group may be centralized or distributed. In some embodiments, the processing engine 820 may be local or remote. For example, the processing engine 820 may access information and/or data from the video camera(s) 810, the storage device 830, and/or the terminal(s) 850 via the network 840. As another example, the processing engine 820 may be directly connected to the video camera(s) 810, the storage device 830, and/or the terminal(s) 850 to access information and/or data. In some embodiments, the processing engine 820 may be implemented on a cloud platform. For example, the cloud platform may include a private cloud, a public cloud, a hybrid cloud, a community cloud, a distributed cloud, an inter-cloud, a multi-cloud, or the like, or any combination thereof. In some embodiments, the processing engine 820 may be implemented by a computing device 900 as illustrated in FIG. 9 or a mobile device 1000 as illustrated in FIG. 10.

The storage device 830 may store data, instructions, and/or any other information. In some embodiments, the storage device 830 may store data obtained from the video camera(s) 810, the processing engine 820, and/or the terminal(s) 850. In some embodiments, the storage device 830 may store data and/or instructions that the processing engine 820 may execute or use to perform exemplary methods described in the present disclosure. In some embodiments, the storage device 830 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 830 may be implemented on a cloud platform as described elsewhere in the disclosure.

In some embodiments, the storage device 830 may be connected to the network 840 to communicate with one or more other components in the video surveillance system 800 (e.g., the processing engine 820, the terminal(s) 850). One or more components in the video surveillance system 800 may access the data or instructions stored in the storage device 830 via the network 840. In some embodiments, the storage device 830 may be part of the processing engine 820.

The network 840 may include any suitable network that can facilitate exchange of information and/or data for the video surveillance system 800. In some embodiments, one or more components of the video surveillance system 800 (e.g., the video camera(s) 810, the processing engine 820, the storage device 830, the terminal(s) 850) may communicate information and/or data with one or more other components of the video surveillance system 800 via the network 840. For example, the processing engine 820 may obtain video data from the video camera(s) 810 via the network 840. As another example, the processing engine 820 may obtain user instruction(s) from the terminal(s) 850 via the network 840. The network 840 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 840 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 840 may include one or more network access points. For example, the network 840 may include wired and/or wireless network access points such as base stations and/or internet exchange points through which one or more components of the video surveillance system 800 may be connected to the network 840 to exchange data and/or information.

The terminal(s) 850 may be connected to and/or communicate with the video camera(s) 810, the processing engine 820, and/or the storage device 830. For example, the terminal(s) 850 may obtain a processed video frame from the processing engine 820. As another example, the terminal(s) 850 may obtain video data acquired via the video camera(s) 810 and transmit the video data to the processing engine 820 for processing. In some embodiments, the terminal(s) 850 may include a mobile device, a tablet computer, a laptop computer, or the like, or any combination thereof. For example, the mobile device may include a mobile phone, a personal digital assistance (PDA), a gaming device, a navigation device, a point of sale (POS) device, a laptop, a tablet computer, a desktop, or the like, or any combination thereof. In some embodiments, the terminal(s) 850 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing engine 820 via, for example, a bus, for further processing. Other types of the input device may include a cursor control device, such as a mouse, a trackball, or cursor direction keys, etc. The output device may include a display, a speaker, a printer, or the like, or any combination thereof. In some embodiments, the terminal(s) 850 may be part of the processing engine 820.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure.

FIG. 9 is a schematic diagram illustrating exemplary hardware and/or software components of an exemplary computing device 900 on which the processing engine 820 (and/or the processing engine 120) may be implemented according to some embodiments of the present disclosure. In some embodiments, the processing engine 120 in FIG. 1 and/or the processing engine 820 in FIG. 8 may be implemented on the computing device 900. As illustrated in FIG. 9, the computing device 900 may include a processor 910, a storage 920, an input/output (I/O) 930, and a communication port 940.

The processor 910 may execute computer instructions (e.g., program code) and perform functions of the processing engine 820 in accordance with techniques described herein. The computer instructions may include, for example, routines, programs, objects, components, data structures, procedures, modules, and functions, which perform particular functions described herein. For example, the processor 910 may process video data obtained from the video camera(s) 810, the storage device 830, terminal(s) 850, and/or any other component of the video surveillance system 800. In some embodiments, the processor 910 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 900. However, it should be noted that the computing device 900 in the present disclosure may also include multiple processors, thus operations and/or method steps that are performed by one processor as described in the present disclosure may also be jointly or separately performed by the multiple processors. For example, if in the present disclosure the processor of the computing device 900 executes both operation A and operation B, it should be understood that operation A and operation B may also be performed by two or more different processors jointly or separately in the computing device 900 (e.g., a first processor executes operation A and a second processor executes operation B, or the first and second processors jointly execute operations A and B).

The storage 920 may store data/information obtained from components of the video surveillance system 800 or the video surveillance system 100. In some embodiments, the storage 920 may include a mass storage, a removable storage, a volatile read-and-write memory, a read-only memory (ROM), or the like, or a combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 920 may store one or more programs and/or instructions to perform exemplary methods described in the present disclosure. For example, the storage 920 may store a program for the processing engine 820 or the processing engine 120 for determining a posture of a human object.

The I/O 930 may input and/or output signals, data, information, etc. In some embodiments, the I/O 930 may enable a user interaction with the processing engine 820 or the processing engine 120. In some embodiments, the I/O 930 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 940 may be connected to a network (e.g., the network 840) to facilitate data communications. For example, the communication port 940 may establish connections between the processing engine 820, the video camera(s) 810, the storage device 830, and/or the terminal(s) 850. As another example, the communication port 940 may establish connections between the processing engine 120, the video camera 110, the data storage 140, and/or the terminal(s) 130. The connection may be a wired connection, a wireless connection, any other communication connection that can enable data transmission and/or reception, and/or a combination of these connections. The wired connection may include, for example, an electrical cable, an optical cable, a telephone wire, or the like, or a combination thereof. The wireless connection may include, for example, a Bluetooth™ link, a Wi-Fi™ link, a WiMax™ link, a WLAN link, a ZigBee™ link, a mobile network link (e.g., 3G, 4G, 5G, etc.), or the like, or a combination thereof. In some embodiments, the communication port 940 may be and/or include a standardized communication port, such as RS232, RS485, etc. In some embodiments, the communication port 940 may be a specially designed communication port. For example, the communication port 940 may be designed in accordance with the digital imaging and communications in medicine (DICOM) protocol.

FIG. 10 is schematic diagram illustrating exemplary hardware and/or software components of an exemplary mobile device 1000 on which the terminal(s) 850 (and/or the terminal(s) 130, the processing engine 120, and/or the processing engine 820) may be implemented according to some embodiments of the present disclosure. As illustrated in FIG. 10, the mobile device 1000 may include a communication platform 1002, a display 1004, a graphic processing unit (GPU) 1006, a central processing unit (CPU) 1008, an I/O 1010, a memory 1012, and a storage 1018. In some embodiments, any other suitable component, including but not limited to a system bus or a controller (not shown), may also be included in the mobile device 1000. In some embodiments, a mobile operating system 1014 (e.g., iOS™, Android™, Windows Phone™, etc.) and one or more applications 1016 may be loaded into the memory 1012 from the storage 1018 in order to be executed by the CPU 1008. The applications 1016 may include a browser or any other suitable mobile apps for receiving and rendering information relating to video processing or other information from the processing engine 820 or the processing engine 120. User interactions with the information stream may be achieved via the I/O 1010 and provided to the processing engine 820 and/or other components of the video surveillance system 800 via the network 840.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A system for motion detection, comprising:
at least one storage medium including a set of instructions;
at least one processor in communication with the at least one storage medium, wherein when executing the set of instructions, the at least one processor is configured to cause the system to:
obtain data related to a video scene of a space from at least one video camera;
detect an object in the video scene;
classify the object as a human object or a non-human object;
when the object is classified as a human object, track movements of the human object;
determine a physical length of a movement trajectory of a head of the human object in the space based on a length of a movement trajectory of the head from a first location in a first frame to a second location in a second frame of the video scene; and
in response to a determination that the physical length of the movement trajectory is not greater than a first threshold,
determine a head size of the human object at the first location in the first frame;
determine whether a difference between the head size and an average head size at the first location in the first frame is greater than a second threshold, wherein the average head size at the first location corresponds to an average value of head sizes of a plurality of human objects in the sitting posture;
determine the posture of the human object in the first frame as a standing posture in response to the determination that the difference is greater than the second threshold; or
determine the posture of the human object in the first frame as a sitting posture in response to the determination that the difference is not greater than the second threshold.

2. The system of claim 1, wherein to determine a physical length of a movement trajectory of a head of the human object in the space based on a length of a movement trajectory of the head from a first location in a first frame to a second location in a second frame of the video scene, the at least one processor is further configured to cause the system to:
detect the head of the human object in the video scene;
track movements of the head of the human object;
determine the movement trajectory of the head of the human object from the first location in the first frame to the second location in the second frame of the video scene;
determine the length and a direction of the movement trajectory in the video scene;
obtain a camera calibration model of the at least one video camera;
determine the physical length of the movement trajectory in the space based on the length of the movement trajectory in the video scene and the camera calibration model.

3. The system of claim 2, wherein the at least one processor is further configured to cause the system to:
in response to the determination that the physical length of the movement trajectory is greater than the first threshold,
determine whether the direction of the movement trajectory is up or down;
if the direction of the movement trajectory is down, determine the posture of the human object in the second frame of the video scene as a sitting posture and determine the posture of the human object in the first frame of the video scene as a standing posture; and
if the direction of the movement trajectory is up, determine the posture of the human object in the second frame of the video scene as the standing posture and determine the posture of the human object in the first frame of the video scene as the sitting posture.

4. The system of claim 2, wherein the camera calibration model is generated based on a learning process, the learning process including:
obtaining sample data related to the video scene of the space, the sample data being associated with a plurality of human objects in the sitting posture;
detecting a plurality of heads of the plurality of human objects;
tracking movements of the plurality of heads;
determining a plurality of average head sizes of the plurality of human objects at a plurality of respective locations in the sitting posture in a sample frame of the video scene;
determining a plurality of average physical head sizes of the plurality of human objects at a plurality of respective physical locations in the sitting posture in the space; and
generating the camera calibration model by associating the plurality of average head sizes at the plurality of respective locations in the sample frame with the plurality of average physical head sizes at the plurality of respective physical locations in the space.

5. The system of claim 1, wherein to determine whether a difference between the head size and an average head size at the first location in the first frame is greater than a second threshold, the at least one processor is further configured to cause the system to:

determine a first physical location of the head of the human object in the space corresponding to the first location of the head of the human object in the first frame based on a camera calibration model;

obtain the average head size at the first location in the first frame based on a reference data set, the first location of the head of the human object in the first frame, and the first physical location of the head of the human object in the space, determine a difference between the average head size and the head size in the first frame; and determine whether the difference between the head size and the average head size at the first location in the first frame is greater than the second threshold.

6. The system of claim 1, wherein the at least one processor is further configured to cause the system to:
determine a role of the human object in the space based at least in part on behaviors of the human object using a neural network model.

7. The system of claim 1, wherein to detect the object in the video scene, the at least one processor is further configured to cause the system to perform at least one of:
determining motion features related to the object;
determining background changes in the video scene; or
determining external features related to the object.

8. The system of claim 1, wherein to classify the object as a human object or a non-human object, the at least one processor is further configured to cause the system to determine human features related to the object.

9. A method implemented on a computing device including at least one processor and at least one computer-readable storage medium for motion detection, the method comprising:
obtaining data related to a video scene of a space from at least one video camera;
detecting an object in the video scene;
classifying the object as a human object or a non-human object;
when the object is classified as a human object, track movements of the human object;
determine a physical length of a movement trajectory of a head of the human object in the space based on a length of a movement trajectory of the head from a first location in a first frame to a second location in a second frame of the video scene; and
in response to a determination that the physical length of the movement trajectory is not greater than a first threshold,
determine a head size of the human object at the first location in the first frame;
determine whether a difference between the head size and an average head size at the first location in the first frame is greater than a second threshold, wherein the average head size at the first location corresponds to an average value of head sizes of a plurality of human objects in the sitting posture;
determine the posture of the human object in the first frame as a standing posture in response to the determination that the difference is greater than the second threshold; or
determine the posture of the human object in the first frame as a sitting posture in response to the determination that the difference is not greater than the second threshold.

10. The method of claim 9, wherein the determining a physical length of a movement trajectory of a head of the human object in the space based on a length of a movement trajectory of the head from a first location in a first frame to a second location in a second frame of the video scene includes:
detecting the head of the human object in the video scene;
tracking movements of the head of the human object;
determining the movement trajectory of the head of the human object from the first location in the first frame to the second location in the second frame of the video scene;
determining the length and a direction of the movement trajectory in the video scene;
obtaining a camera calibration model of the at least one video camera;
determining the physical length of the movement trajectory in the space based on the length of the movement trajectory in the video scene and the camera calibration model.

11. The method of claim 10, further comprising:
in response to the determination that the physical length of the movement trajectory is greater than the first threshold,
determining whether the direction of the movement trajectory is up or down;
if the direction of the movement trajectory is down, determining the posture of the human object in the second frame of the video scene as a sitting posture and determine the posture of the human object in the first frame of the video scene as a standing posture; and
if the direction of the movement trajectory is up, determining the posture of the human object in the second frame of the video scene as the standing posture and determine the posture of the human object in the first frame of the video scene as the sitting posture.

12. The method of claim 10, wherein the camera calibration model is generated based on a learning process, the learning process including:
obtaining sample data related to the video scene of the space, the sample data being associated with a plurality of human objects in the sitting posture;
detecting a plurality of heads of the plurality of human objects;
tracking movements of the plurality of heads;
determining a plurality of average head sizes of the plurality of human objects at a plurality of respective locations in the sitting posture in a sample frame of the video scene;
determining a plurality of average physical head sizes of the plurality of human objects at a plurality of respective physical locations in the sitting posture in the space; and
generating the camera calibration model by associating the plurality of average head sizes at the plurality of respective locations in the sample frame with the plurality of average physical head sizes at the plurality of respective physical locations in the space.

13. The method of claim 9, wherein the determining whether a difference between the head size and an average head size at the first location in the first frame is greater than a second threshold includes:
determining a first physical location of the head of the human object in the space corresponding to the first location of the head of the human object in the first frame based on a camera calibration model;
obtaining the average head size at the first location in the first frame based on a reference data set, the first location of the head of the human object in the first frame, and the first physical location of the head of the human object in the space;

determining a difference between the average head size and the head size in the first frame; and determining whether the difference between the head size and the average head size at the first location in the first frame is greater than the second threshold.

14. The method of claim 9, further comprising:

determining a role of the human object in the space based at least in part on behaviors of the human object using a neural network model.

15. The method of claim 9, wherein the detecting the object in the video scene includes at least one of:

determining motion features related to the object;

determining background changes in the video scene; or determining external features related to the object.

16. The method of claim 9, wherein the classifying the object as a human object or a non-human object includes determining human features related to the object.

17. A non-transitory computer readable medium embodying a computer program product, the computer program product comprising instructions configured to cause a computing device to:

obtain data related to a video scene of a space from at least one video camera;

detect an object in the video scene;

classify the object as a human object or a non-human object;

when the object is classified as a human object, track movements of the human object;

determine a physical length of a movement trajectory of a head of the human object in the space based on a length of a movement trajectory of the head from a first location in a first frame to a second location in a second frame of the video scene; and in response to a determination that the physical length of the movement trajectory is not greater than a first threshold, determine a head size of the human object at the first location in the first frame;

determine whether a difference between the head size and an average head size at the first location in the first frame is greater than a second threshold, wherein the average head size at the first location corresponds to an average value of head sizes of a plurality of human objects in the sitting posture;

determine the posture of the human object in the first frame as a standing posture in response to the determination that the difference is greater than the second threshold; or determine the posture of the human object in the first frame as a sitting posture in response to the determination that the difference is not greater than the second threshold.

18. The non-transitory computer readable medium of claim 17, wherein to determine a physical length of a movement trajectory of a head of the human object in the space based on a length of a movement trajectory of the head from a first location in a first frame to a second location in a second frame of the video scene, the instructions are further configured to cause the computing device to:

detect the head of the human object in the video scene;

track movements of the head of the human object;

determine the movement trajectory of the head of the human object from the first location in the first frame to the second location in the second frame of the video scene;

determine the length and a direction of the movement trajectory in the video scene;

obtain a camera calibration model of the at least one video camera;

determine the physical length of the movement trajectory in the space based on the length of the movement trajectory and the camera calibration model.

19. The non-transitory computer readable medium of claim 18, wherein the instructions are further configured to cause the computing device to:

in response to the determination that the physical length of the movement trajectory is greater than the first threshold, determine whether the direction of the movement trajectory is up or down;

if the direction of the movement trajectory is down, determine the posture of the human object in the second frame of the video scene as a sitting posture and determine the posture of the human object in the first frame of the video scene as a standing posture; and if the direction of the movement trajectory is up, determine the posture of the human object in the second frame of the video scene as the standing posture and determine the posture of the human object in the first frame of the video scene as the sitting posture.

20. The non-transitory computer readable medium of claim 19, wherein to determine whether a difference between the head size and an average head size at the first location in the first frame is greater than a second threshold, the instructions are further configured to cause the computing device to:

determine a first physical location of the head of the human object in the space corresponding to the first location of the head of the human object in the first frame based on a camera calibration model;

obtain the average head size at the first location in the first frame based on a reference data set, the first location of the head of the human object in the first frame, and the first physical location of the head of the human object in the space;

determine a difference between the average head size and the head size in the first frame; and determine whether the difference between the head size and the average head size at the first location in the first frame is greater than the second threshold.

* * * * *